United States Patent
Kim et al.

(10) Patent No.: US 11,510,268 B2
(45) Date of Patent: Nov. 22, 2022

(54) METHOD AND APPARATUS FOR DISCARDING BUFFERED DATA WHILE KEEPING CONNECTION IN CP-UP SEPARATION

(71) Applicant: LG ELECTRONICS INC., Seoul (KR)

(72) Inventors: Seokjung Kim, Seoul (KR); Jian Xu, Seoul (KR); Daewook Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 137 days.

(21) Appl. No.: 16/980,065

(22) PCT Filed: Apr. 1, 2019

(86) PCT No.: PCT/KR2019/003779
§ 371 (c)(1),
(2) Date: Sep. 11, 2020

(87) PCT Pub. No.: WO2019/194486
PCT Pub. Date: Oct. 10, 2019

(65) Prior Publication Data
US 2021/0185755 A1 Jun. 17, 2021

(30) Foreign Application Priority Data
Apr. 2, 2018 (KR) .................. 10-2018-0038199

(51) Int. Cl.
*H04W 76/19* (2018.01)
*H04W 76/34* (2018.01)
*H04W 76/27* (2018.01)
*H04W 28/06* (2009.01)
(Continued)

(52) U.S. Cl.
CPC .......... *H04W 76/19* (2018.02); *H04W 28/06* (2013.01); *H04W 68/005* (2013.01);
(Continued)

(58) Field of Classification Search
CPC ... H04W 76/19; H04W 28/06; H04W 68/005; H04W 76/27; H04W 76/34; H04W 80/02; H04W 36/02
See application file for complete search history.

(56) References Cited

U.S. PATENT DOCUMENTS 10,932,168 B2 * 2/2021 Yang ................. H04W 36/0055
2018/0270895 A1 * 9/2018 Park ..................... H04W 8/005
(Continued)

FOREIGN PATENT DOCUMENTS

EP 3484235 A1 5/2019
WO 2018008925 A1 1/2018

OTHER PUBLICATIONS

KT Corp., "Resource Management for Separation of CP and UP in CU," R3-173810, 3GPP TSG RAN WG3 #97bis, Prague, Czech, Sep. 29, 2017, see pp. 1-3 and figure 1.
(Continued)

*Primary Examiner* — Will W Lin
(74) *Attorney, Agent, or Firm* — Dentons US LLP

(57) ABSTRACT

A method and apparatus for discarding a buffered data in a wireless communication system is described. A central unit (CU) user plane (UP) of a gNB receives a buffered data discard indication from a CU-control plane (CU-CP) of the gNB, and discards buffered data for a user equipment (UE) based on the buffered data discard indication. Even after discarding the buffered data, UE context is still kept. The CU-CP is a logical node constituting the gNB that hosts a radio resource control (RRC) protocol and a packet data convergence protocol (PDCP)-C protocol, and the CU-UP is a logical node constituting the gNB that hosts a PDCP-U protocol.

8 Claims, 13 Drawing Sheets

(51) Int. Cl.
*H04W 68/00* (2009.01)
*H04W 80/02* (2009.01)

(52) U.S. Cl.
CPC .......... *H04W 76/27* (2018.02); *H04W 76/34* (2018.02); *H04W 80/02* (2013.01)

(56) References Cited

U.S. PATENT DOCUMENTS

2019/0075552 A1* 3/2019 Yu .................. H04W 76/10
2019/0182211 A1* 6/2019 Yang ............... H04L 69/326
2019/0215800 A1* 7/2019 Fujishiro ............ H04W 8/08

OTHER PUBLICATIONS

Catt, "Discussion on RAN paging failure," R3-173612, 3GPP TSG RAN WG3 #97bis, Prague, Czech, Sep. 29, 2017, see pp. 1-3.
Ericsson, "Bearer Context Procedure," R3-181428, 3GPP TSG RAN WG3 #99, Athens, Greece, Mar. 12, 2018, see pp. 1-4.
Ericsson, "Dual Connectivity deployment options and relation to XnUP/X2UP/F1UP," R3-172549, 3GPP TSG RAN WG3 NR AH #2, Qingdao, China, Jun. 19, 2017, see pp. 1-5.
Intel Corporation, "Enhancement for intra CU-CP handover in NG-RAN with separated CP and UP," R3-174630, 3GPP TSG RAN WG3 #98, Reno, USA, Nov. 17, 2017, see pp. 1-6.
Huawei, Intel Corporation, "RAN paging failure handling", 3GPP TSG-RAN WG3 Meeting #97bis, Oct. 9-13, 2017, R3-173703.
NTT DoCoMo, Inc., "How to acquire status of re-transmitted packets", 3GPP TSG-RAN WG3 #98, Nov. 27-Dec. 1, 2017, R3-174846.

* cited by examiner

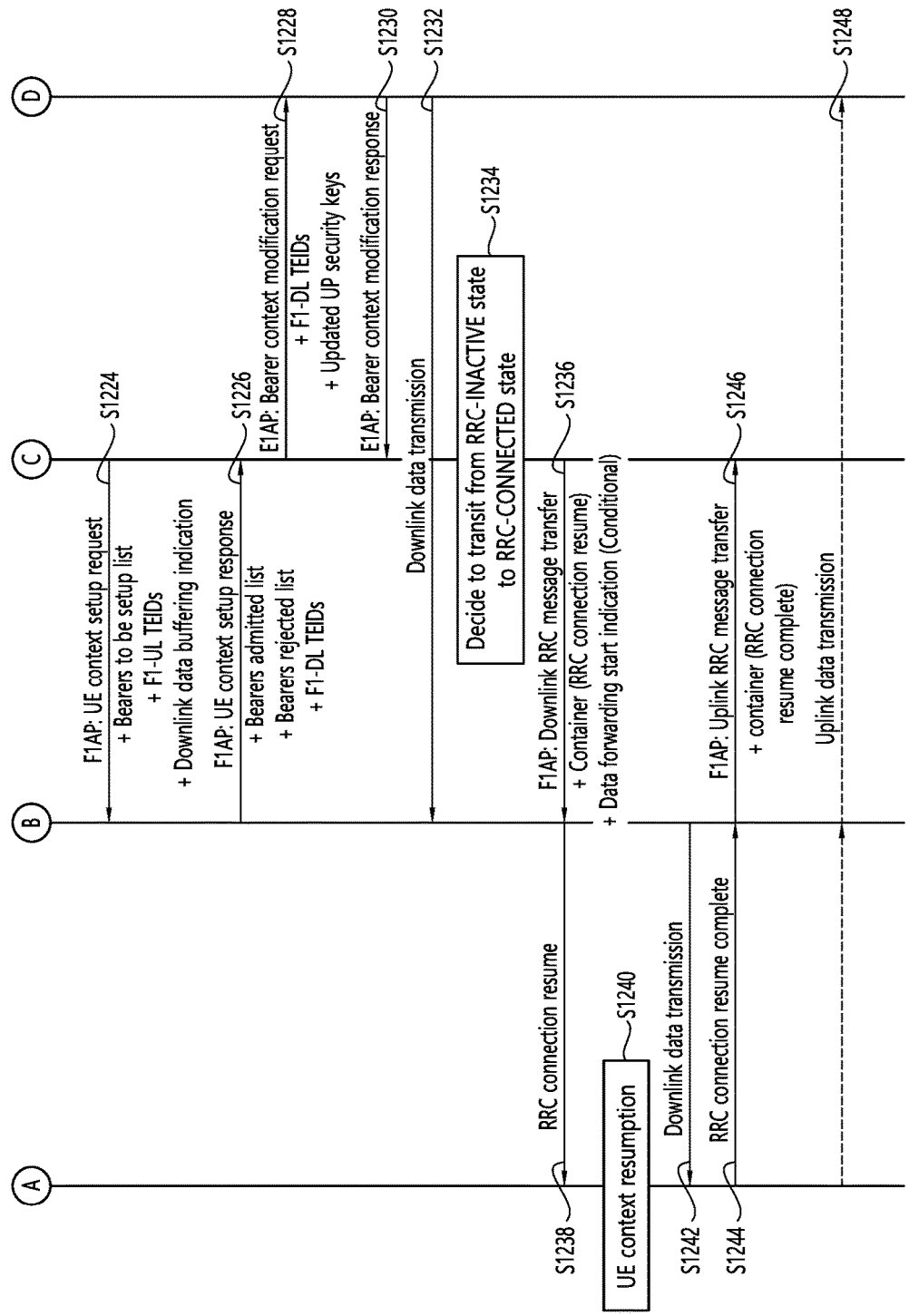

METHOD AND APPARATUS FOR DISCARDING BUFFERED DATA WHILE KEEPING CONNECTION IN CP-UP SEPARATION

This application is the National Stage filing under 35 U.S.C. 371 of International Application No. PCT/KR2019/003779, filed on Apr. 1, 2019, which claims the benefit of Korean Patent Application No. 10-2018-0038199 filed on Apr. 2, 2018, the contents of which are all hereby incorporated by reference herein in their entirety.

TECHNICAL FIELD

The present invention relates to wireless communication and, more particularly, to a method and apparatus for discarding a buffered data while keeping connection when a central unit (CU)-control plane (CP) and a CU-user plane (UP) are separated in a new radio access technology (NR) system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Mobile carriers are providing more services in service areas which get smaller. This small service area may be specified as a small cell. However, it may be an issue to communicate travelling between these small service areas, in which all of capacity, coverage, and interference need to be considered. Accordingly, it has been proposed to serve small cells through a centralized radio access network (C-RAN). One requirement for implementing the C-RAN is a new concept called fronthaul.

In NR, it has been introduced to divide a base station (e.g. gNB) into a central unit (CU) and a distributed unit (DU) in order to solve the problem of fronthaul. In addition, it has been introduced to divide the CU into a CU-control plane (CP) and a CU-user plane (UP) in order to realize the concept of cloud RAN.

SUMMARY

When a next-generation radio access network (NG-RAN) node (e.g. gNB) has only pending user plane data for transmission and the RAN-initiated paging is failed, the NG-RAN node may keep NG connection active or initiate the access network release procedure based on local configuration in the NG-RAN node. In CP-UP separation, which node/entity in the NG-RAN node decides the follow-up steps for the RAN paging failure is still not yet determined.

In an aspect, a method performed by a central unit (CU) user plane (UP) of a gNB in a wireless communication system is provided. The method includes receiving a buffered data discard indication from a CU-control plane (CU-CP) of the gNB, and discarding buffered data for a user equipment (UE) based on the buffered data discard indication. The CU-CP is a logical node constituting the gNB that hosts a radio resource control (RRC) protocol and a packet data convergence protocol (PDCP)-C protocol, and the CU-UP is a logical node constituting the gNB that hosts a PDCP-U protocol.

In another aspect, a central unit (CU) user plane (UP) of a gNB in a wireless communication system is provided. The CU-CP is configured to receive a buffered data discard indication from a CU-control plane (CU-CP) of the gNB, and discard buffered data for a user equipment (UE) based on the buffered data discard indication. The CU-CP is a logical node constituting the gNB that hosts a radio resource control (RRC) protocol and a packet data convergence protocol (PDCP)-C protocol, and the CU-UP is a logical node constituting the gNB that hosts a PDCP-U protocol.

First, for the RAN paging failure, the CU-CP or CU-UP can efficiently control whether to keep the NG connection active, or to release the NG connection with deleting the stored UE context. The CU-CP or CU-UP can discard buffered data while keeping the NG connection.

Second, the CU-CP can efficiently control whether the CU-UP or DU forwards the buffered DL data to the UE or not. Therefore, UE's experience can be enhanced since the loss of DL data can be avoided and the unnecessary latency due to the data retransmission can be reduced.

BRIEF DESCRIPTION OF THE DRAWINGS

FIG. 13 shows an overall procedure according to the embodiment 2-2 of the present invention.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
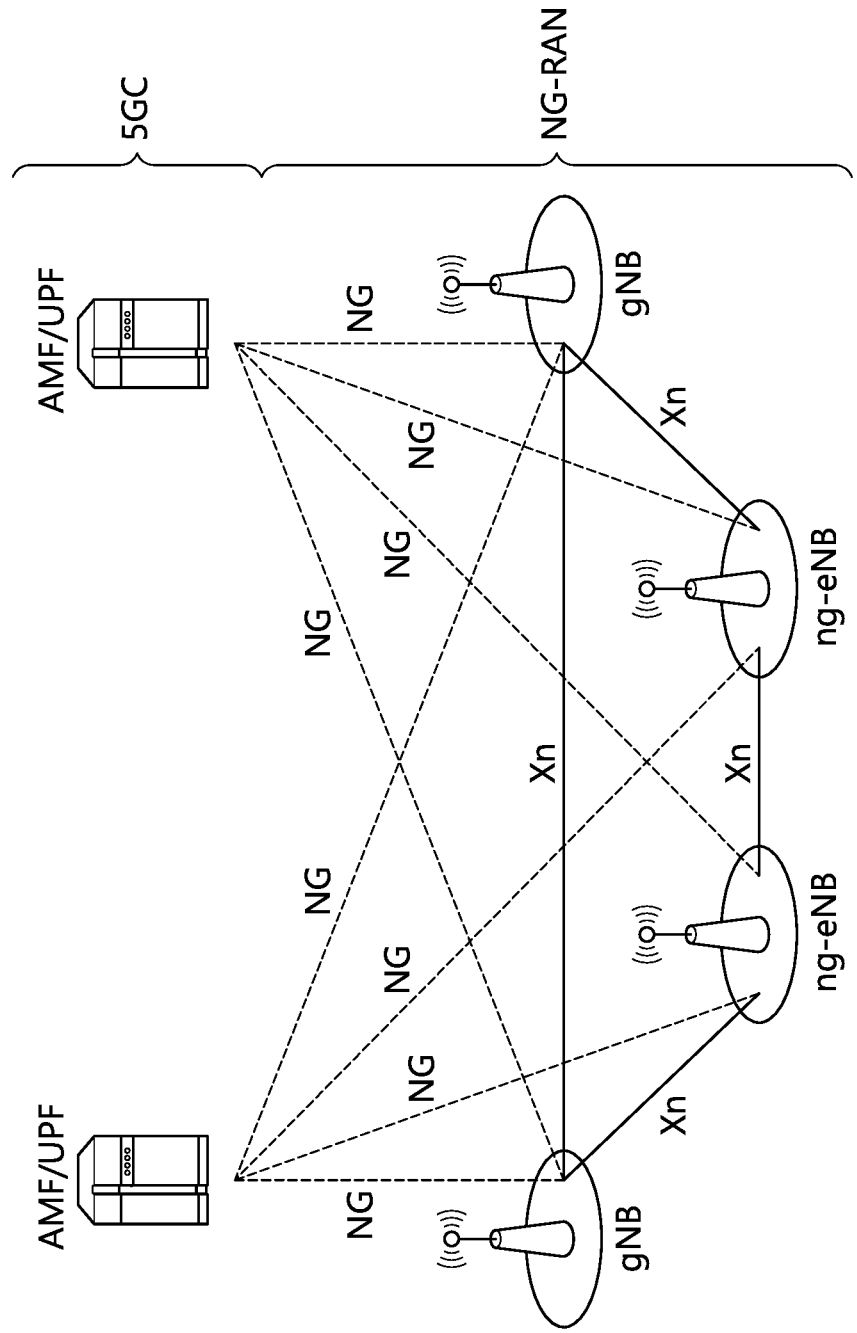
FIG. 1 shows an example of a wireless communication system to which technical features of the present invention can be applied.

FIG. 1 shows an example of a wireless communication system to which technical features of the present invention can be applied.

Specifically, FIG. 1 shows a system architecture based on a 5G new radio access technology (NR) system. The entity used in the 5G NR system (hereinafter, simply referred to as "NR") may absorb some or all of the functions of the entities introduced in LTE (e.g. eNodeB (eNB), mobility management entity (MME), serving gateway (S-GW), etc.). The entity used in the NR system may be identified by the name "NG" for distinction from the LTE/LTE-A.

Referring to FIG. 1, the wireless communication system includes one or more UE, a next-generation RAN (NG-RAN) and a 5th generation core network (5GC). The NG-RAN consists of at least one NG-RAN node. The NG-RAN node consists of at least one gNB and/or at least one ng-eNB. The gNB provides NR user plane and control plane protocol terminations towards the UE. The ng-eNB 22 provides E-UTRA user plane and control plane protocol terminations towards the UE.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW.

The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

The gNB and/or ng-eNB host the following functions:

Functions for radio resource management: Radio bearer control, radio admission control, connection mobility control, dynamic allocation of resources to UEs in both uplink and downlink (scheduling);

Internet protocol (IP) header compression, encryption and integrity protection of data;

Selection of an AMF at UE attachment when no routing to an AMF can be determined from the information provided by the UE;

Routing of user plane data towards UPF(s);

Routing of control plane information towards AMF;

Connection setup and release;

Scheduling and transmission of paging messages;

Scheduling and transmission of system broadcast information (originated from the AMF or operations & maintenance (O&M));

Measurement and measurement reporting configuration for mobility and scheduling;

Transport level packet marking in the uplink;

Session management;

Support of network slicing;

QoS flow management and mapping to data radio bearers;

Support of UEs in RRC_INACTIVE state;

Distribution function for non-assess stratum (NAS) messages;

Radio access network sharing;

Dual connectivity;

Tight interworking between NR and E-UTRA.

The AMF hosts the following main functions:

NAS signaling termination;

NAS signaling security;

AS security control;

Inter CN node signaling for mobility between 3GPP access networks;

Idle mode UE reachability (including control and execution of paging retransmission);

Registration area management;

Support of intra-system and inter-system mobility;

Access authentication;

Access authorization including check of roaming rights;

Mobility management control (subscription and policies);

Support of network slicing;

SMF selection.

The UPF hosts the following main functions:

Anchor point for Intra-/Inter-radio access technology (RAT) mobility (when applicable);

External protocol data unit (PDU) session point of interconnect to data network;

Packet routing & forwarding;

Packet inspection and user plane part of policy rule enforcement;

Traffic usage reporting;

Uplink classifier to support routing traffic flows to a data network;

Branching point to support multi-homed PDU session;

QoS handling for user plane, e.g. packet filtering, gating, UL/DL rate enforcement;

Uplink traffic verification (service data flow (SDF) to QoS flow mapping);

Downlink packet buffering and downlink data notification triggering.

The SMF hosts the following main functions:

Session management;

UE IP address allocation and management;

Selection and control of UP function;

Configures traffic steering at UPF to route traffic to proper destination;

Control part of policy enforcement and QoS;

Downlink data notification.

Figure 2:
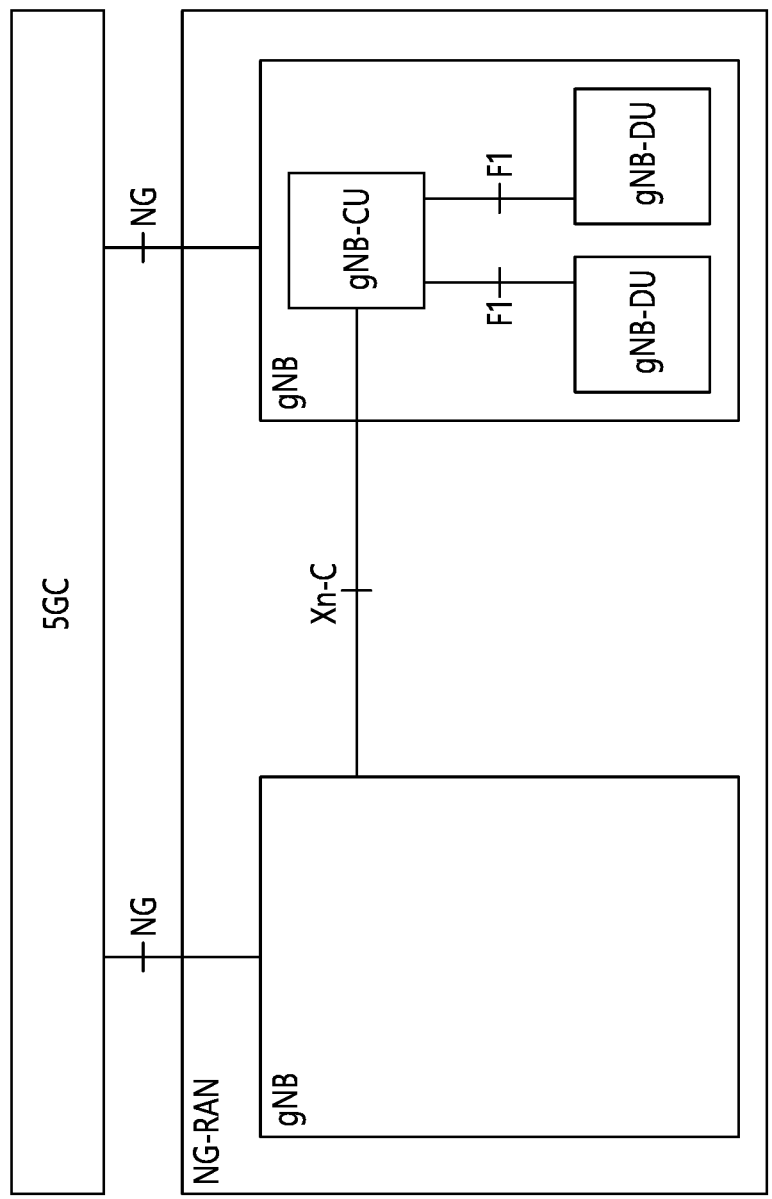
FIG. 2 shows an example of the overall architecture of an NG-RAN.

FIG. 2 shows an example of the overall architecture of an NG-RAN.

Referring to FIG. 2, a gNB may include a gNB-central unit (CU) (hereinafter, gNB-CU may be simply referred to as CU) and at least one gNB-distributed unit (DU) (hereinafter, gNB-DU may be simply referred to as DU).

The gNB-CU is a logical node that hosts a radio resource control (RRC) protocol, a service data adaptation protocol (SDAP) and a packet data convergence protocol (PDCP) of the gNB or an RRC protocol and a PDCP protocol of an en-gNB. The gNB-CU controls the operation of the at least one gNB-DU.

The gNB-DU is a logical node that hosts radio link control (RLC), media access control (MAC), and physical layers of the gNB or the en-gNB. The operation of the gNB-DU is partly controlled by the gNB-CU. One gNB-DU supports one or more cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Figure 3:
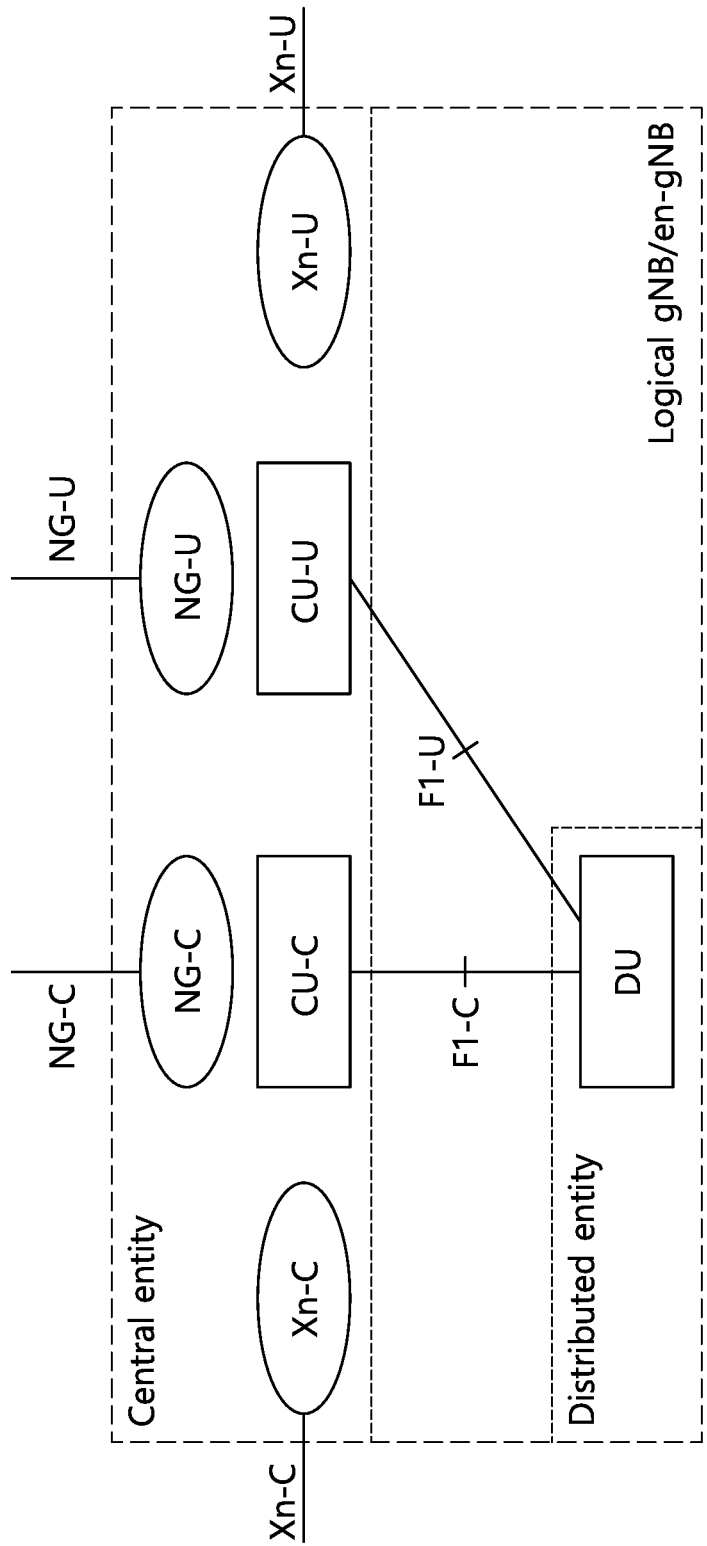
FIG. 3 shows logical nodes (CU-C, CU-U, and DU) in a logical gNB/en-gNB.

FIG. 3 shows logical nodes (CU-C, CU-U, and DU) in a logical gNB/en-gNB. FIG. 3 shows one possible deployment scenario for the NG-RAN shown in FIG. 2. The protocol termination of NG and Xn interfaces is indicated by an ellipse in FIG. 3. In FIG. 3, a central entity and a distributed entity represent physical network nodes.

Figure 4:
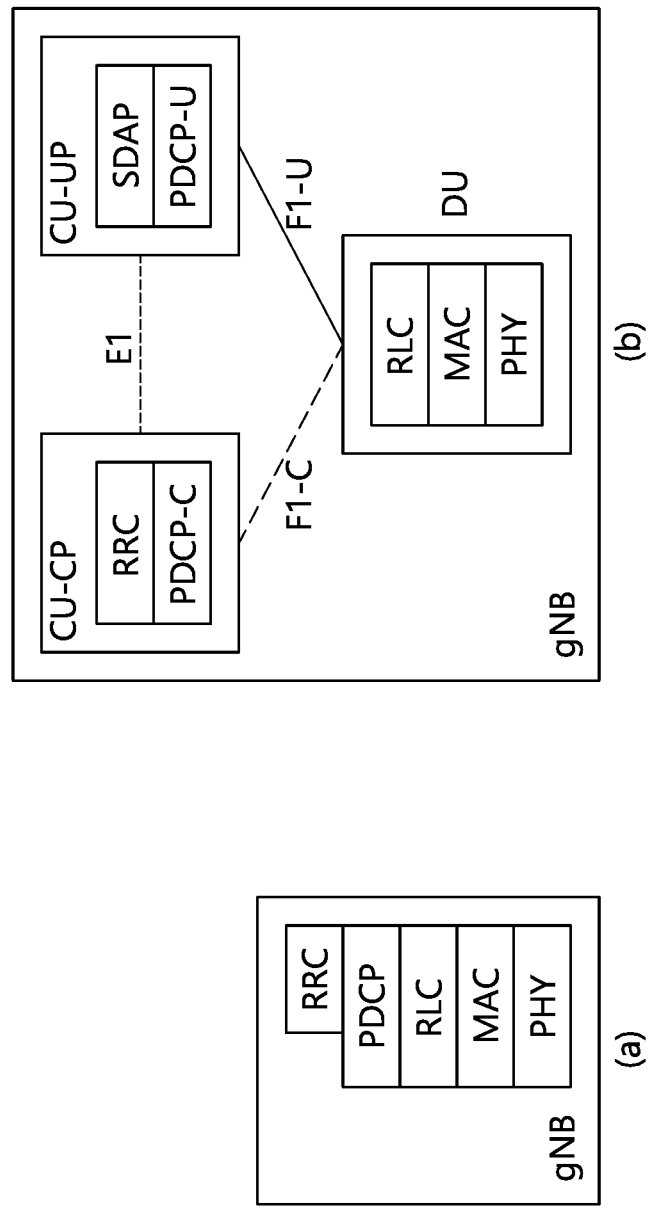
FIG. 4 shows a deployment scenario for a gNB.

FIG. 4 shows a deployment scenario for a gNB. FIG. 4 shows an example of the architecture and the possible deployment scenario of the NG-RAN illustrated in FIGS. 2 and 3.

FIG. 4-(a) shows a collapsed gNB deployment scenario. In this deployment scenario, all RAN protocols and functions are in the same location. This deployment scenario corresponds to that currently used in LTE. This deployment scenario is similar to LTE architecture, thus ensuring maximum backward compatibility with the existing LTE deployment scenario.

FIG. 4-(b) shows a disaggregated deployment scenario. In this deployment scenario, RAN protocol functions are distributed across different locations, such as a gNB-CU and a gNB-DU. The gNB-DU hosts RLC, MAC, and physical layers. A gNB-CU-CP (hereinafter, gNB-CU-CP may be simply referred to as CU-CP) hosts RRC and PDCP-C protocols. A gNB-CU-UP (hereinafter, gNB-CU-UP may be simply referred to as CU-UP) hosts a PDCP-U (and SDAP) protocol.

A gNB may consist of a gNB-CU-CP, multiple gNB-CU-UPs and multiple gNB-DUs. The gNB-CU-CP is connected to the gNB-DU through the F1-C interface. The gNB-CU-UP is connected to the gNB-DU through the F1-U interface. The gNB-CU-UP is connected to the gNB-CU-CP through the E1 interface. One gNB-DU is connected to only one gNB-CU-CP. One gNB-CU-UP is connected to only one gNB-CU-CP. However, a gNB-DU and/or a gNB-CU-UP may be connected to multiple gNB-CU-CPs by appropriate implementation. One gNB-DU can be connected to multiple gNB-CU-UPs under the control of the same gNB-CU-CP. One gNB-CU-UP can be connected to multiple gNB-DUs under the control of the same gNB-CU-CP. The connectivity between a gNB-CU-UP and a gNB-DU is established by the gNB-CU-CP using bearer context management functions. The gNB-CU-CP selects the appropriate gNB-CU-UP(s) for the requested services for the UE. In case of multiple gNB-CU-Ups, they belong to same security domain. Data forwarding between gNB-CU-UPs during intra-gNB-CU-CP handover within a gNB may be supported by Xn-U.

According to the disaggregated deployment scenario illustrated in FIG. 4-(b), the RAN functions may be optimally deployed at different locations based on the scenario and desired performance. For example, the CU-CP may be located near the DU. Alternatively, the CU-CP may be deployed together with DU. In this case, a short latency time may be provided for an important CP procedure, such as connection (re)establishment, handover, and state transition. On the other hand, the CU-UP may be centralized in a regional or national data center. Thus, the CU-UP is advantageous for cloud implementation and may provide a centralized termination point for UP traffic in dual connectivity and tight interworking scenarios. Further, an additional CU-UP may be disposed close to (or co-located with) the DU to provide a local termination point of UP traffic for an application requiring a very low latency time (e.g. ultra-reliable low-latency communications (URLLC) traffic).

Figure 5:
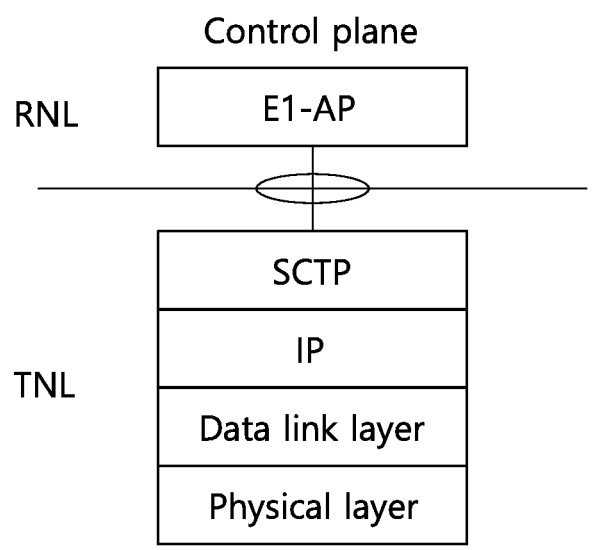
FIG. 5 shows the protocol structure of an E1 interface defined between a gNB-CU-CP and a gNB-CU-UP.

FIG. 5 shows the protocol structure of an E1 interface defined between a gNB-CU-CP and a gNB-CU-UP. A transport network layer (TNL) is based on Internet protocol (IP) transmission and includes a stream control transmission protocol (SCTP) layer above an IP layer. An application-layer signaling protocol is referred to as an E1 application protocol (E1AP).

RRC inactive state (RRC_INACTIVE) may be characterized as follows.

Public land mobile network (PLMN) selection;

Broadcast of system information;

Cell re-selection mobility;

Paging is initiated by NG-RAN (RAN paging);

RAN-based notification area (RNA) is managed by NG-RAN;

Discontinuous reception (DRX) for RAN paging configured by NG-RAN;

5GC—NG-RAN connection (both C/U-planes) is established for UE;

The UE access stratum (AS) context is stored in NG-RAN and the UE;

NG-RAN knows the RNA which the UE belongs to.

Paging is described. The UE in RRC_IDLE and RRC_INACTIVE states may use DRX in order to reduce power consumption. While in RRC_IDLE, the UE monitors the paging control channel (PCCH) for core network (CN)-initiated paging information. While in RRC_INACTIVE, the UE monitors the PCCH for RAN-initiated and CN-initiated paging information. NG-RAN and 5GC paging occasions overlap and the same paging mechanism is used in NG-RAN and in 5GC. The UE monitors one paging occasion per DRX cycle for the reception of paging as follows:

Paging DRX cycle length is configurable:
A default DRX cycle for CN-initiated paging is configurable via system information;
While in RRC_IDLE, a UE specific DRX cycle for CN-initiated paging is configurable via UE dedicated signaling.
NG-RAN can configure a UE with a DRX cycle used for RAN-initiated paging.
This configuration can be UE specific.
The number of paging occasions in a DRX cycle is configurable via system information:
A network may distribute UEs to the paging occasions based on UE id when multiple paging occasions are configured in the DRX cycle.
Paging occasion can consist of multiple time slots (e.g. subframe or OFDM symbol). The number of time slots in a paging occasion is configurable via system information:
A network may transmit a paging using a different set of DL transmission beam(s) or repetitions in each time slot.

In NR, for CP-UP separation, discussion on how the gNB-CU-CP and gNB-CU-UP support the UE in RRC_INACTIVE is in progress. Specifically, it is possible that the last serving gNB-CU-CP receives no paging response from the UE in RRC_INACTIVE. If the RAN paging procedure is not successful in establishing contact with the UE, and if NG RAN has only pending user plane data for transmission, the NG-RAN node may keep the NG connection active or initiate the access network release procedure based on local configuration in NG-RAN.

In CP-UP separation, which node/entity (i.e. either gNB-CU-CP or gNB-CU-UP) decides the follow-up steps for the RAN paging failure is still not yet determined. That is, in the case of RAN paging failure for the DL data, the information on whether to maintain or release the NG connection should be configured in the gNB-CU-CP or gNB-CU-UP. The initiation of the access network release procedure for RAN paging failure can be handled by the legacy procedure irrespective of which node/entity makes a decision. However, the detailed procedure to keep the NG connection active and discard the buffered DL data for the RAN paging failure is not yet discussed. Since the gNB-CU-CP and gNB-CU-UP may be located at different physical sites in CP-UP separation, how to keep the NG connection active and discard the buffered DL data for the RAN paging failure should be discussed.

1. Embodiment 1-1

According to the embodiment 1-1 of the present invention, when the gNB-CU-CP detects the RAN paging failure for the DL data, the gNB-CU-CP can decide whether to maintain or release the NG connection for the UE. If the last serving gNB-CU-CP decides to keep the NG connection active, the gNB-CU-CP indicates to the gNB-CU-UP that the buffered DL data should be discarded with keeping the bearer context for the UE. That is, when the last serving gNB-CU-CP is capable of deciding to keep the NG connection active and to discard the buffered DL data only, the last serving gNB-CU-CP indicates to the last serving gNB-CU-UP to immediately discard the buffered DL data and to store the UE context related to paging failure. This can be solved by adding a new indication related to the RAN paging failure into the BEARER CONTEXT MODIFICATION REQUEST message. This indication enables the gNB-CU-UP to just discard the buffered DL data for the UE and keep the bearer context for the UE.

Figure 6:
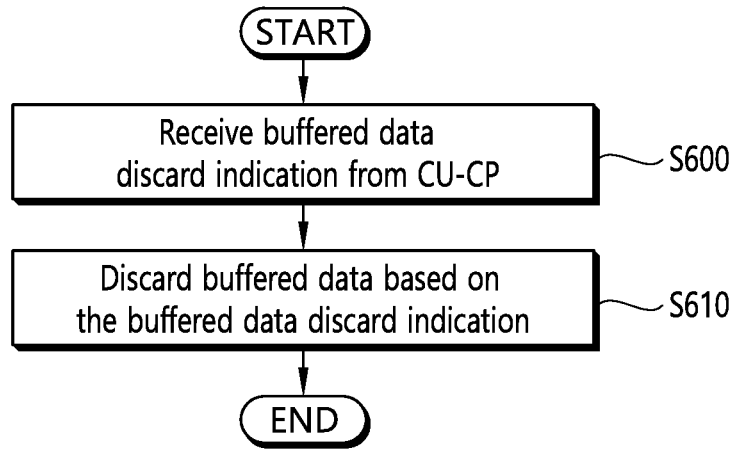
FIG. 6 shows a method for discarding buffered data performed by gNB-CU-UP according to the embodiment 1-1 of the present invention.

FIG. 6 shows a method for discarding buffered data performed by gNB-CU-UP according to the embodiment 1-1 of the present invention.

In step S600, the gNB-CU-UP receives a buffered data discard indication from the gNB-CU-CP. In step S610, the gNB-CU-UP discards buffered data for a UE based on the buffered data discard indication. The CU-CP is a logical node constituting the gNB that hosts RRC protocol and PDCP-C protocol, and the CU-UP is a logical node constituting the gNB that hosts a PDCP-U protocol.

The buffered data discard indication may indicate that RAN paging failure occurs for the UE. The gNB-CU-UP may keep storing a context of the UE. A connection between the CU-UP and UPF may be maintained. A connection between the CU-CP and AMF may be maintained.

The buffered data discard indication may be transmitted via a BEARER CONTEXT MODIFICATION REQUEST message. The buffered data discard indication may be an IE (e.g. "Data Discard Required" IE) in the BEARER CONTEXT MODIFICATION REQUEST message. Table 1 shows an example of the BEARER CONTEXT MODIFICATION REQUEST message. This message is sent by the gNB-CU-CP to request the gNB-CU-UP to modify a bearer context.

TABLE 1

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |
| gNB-CU-UP UE E1AP ID | M | | 9.3.1.5 | | YES | reject |
| Security Information | O | | 9.3.1.10 | | YES | reject |
| UE DL Aggregate Maximum Bit Rate | O | | Bit Rate 9.3.1.20 | | YES | reject |
| Bearer Context Status Change | O | | ENUMERATED (Suspend, Resume, . . . ) | Indicates to Suspend or Resume the Bearer Context | YES | |
| New UL TNL Information Required | O | | ENUMERATED (required, . . . ) | Indicates that new UL TNL information has been requested to be provided. | YES | reject |

TABLE 1-continued

| IE/Group Name | Presence | Range | IE type and reference | Semantics description | Criticality | Assigned Criticality |
|---|---|---|---|---|---|---|
| UE Inactivity Timer | O | | Inactivty Timer 9.3.1.54 | Included if the Activity Level Notification is set to UE. | — | — |
| Data Discard Required | O | | ENUMERATED (required, . . . ) | Indicates to discard the buffered data and suspend the Bearer Context | YES | reject |
| CHOICE System | O | | | | YES | reject |
| >E-UTRAN | | | | | | |
| >>DRB To Setup List | | 0 . . . 1 | | | YES | reject |
| >>>DRB To Setup Item | | 1 . . . <maxnoof DRBs> | | | — | — |
| >>>>DRB ID | M | | 9.3.1.16 | | — | — |
| >>>>PDCP Configuration | M | | 9.3.1.38 | | — | — |
| >>>>E-UTRAN QoS | M | | 9.3.1.17 | | — | — |
| >>>>S1 UL UP Trasnport Layer Information | M | | UP Transport Layer Information9.3.2.1 | | — | — |
| >>>>Data Forwarding Information Request | O | | 9.3.2.5 | | — | — |
| >>>>Cell Group Information | M | | 9.3.1.11 | The gNB-CU-UP shall provide one UL UP Transport Layer Information Item per cell group entry | — | — |
| >>>>DL UP Parameters | O | | 9.3.1.13 | | — | — |
| >>>>DRB Inactivity Timer | O | | Inactivty Timer 9.3.1.54 | Included if the Activity Level Notification is set to DRB. | — | — |
| >>DRB To Modify List | | 0 . . . 1 | | | YES | reject |
| >>>DRB To Modify Item | | 1 . . . <maxnoof DRBs> | | | — | — |
| >>>>DRB ID | M | | 9.3.1.16 | | — | — |
| >>>>PDCP Configuration | O | | 9.3.1.38 | | — | — |
| >>>>E-UTRAN QoS | O | | 9.3.1.17 | | — | — |
| >>>>S1 UL UP Transport Layer Information | O | | UP Transport Layer Information9.3.2.1 | | — | — |
| >>>>Data Forwarding Information Request | O | | 9.3.2.5 | | — | — |
| >>>>PDCP Count Request | O | | ENUMERATED (requested, . . . ) | The gNB-CU-CP requests the gNB-CU-UP to provide the PDCP Count in the response message. | — | — |
| >>>>PDCP UL Count | O | | PDCP Count9.3.1.35 | PDCP count for first unacknowledged UL packet. | — | — |
| >>>>PDCP DL Count | O | | PDCP Count 9.3.1.35 | PDCP count for next DL packet to be assigned. | — | — |
| >>>>DL UP Parameters | O | | 9.3.1.13 | | — | — |
| >>>>Cell Group To Add | O | | 9.3.1.11 | | — | — |
| >>>>Cell Group To Modify | O | | 9.3.1.11 | | — | — |
| >>>>Cell Group To Remove | O | | 9.3.1.11 | | — | — |
| >>>>DRB Inactivity Timer | O | | Inactivty Timer 9.3.1.54 | Included if the Activity Level Notification is set to DRB. | — | — |
| >>DRB To Remove List | | 0 . . . 1 | | | YES | reject |
| >>>DRB To Remove Item | | 1 . . . <maxnoof DRBs> | | | — | — |
| >>>>DRB ID | M | | 9.3.1.16 | | — | — |
| >NG-RAN | | | | | | |
| >>PDU Session Resource To Setup List | | 0 . . . 1 | | | YES | reject |

TABLE 1-continued

| IE/Group Name | Presence | Range | IE type and reference | Semantics description | Criticality | Assigned Criticality |
|---|---|---|---|---|---|---|
| >>>PDU Session Resource To Setup Item | | 1 . . . <maxnoof PDUSession Resource> | | | — | — |
| >>>>PDU Session ID | M | | 9.3.1.21 | | — | — |
| >>>>PDU Session Type | M | | 9.3.1.22 | | — | — |
| >>>>S-NSSAI | M | | 9.3.1.9 | | — | — |
| >>>>Security Indication | M | | 9.3.1.23 | | — | — |
| >>>>PDU Session Resource DL Aggregate Maximum Bit Rate | O | | 9.3.1.20 | This IE shall be present when non-GBR QoS Flows are setting up. | — | — |
| >>>>NG UL UP Transport Layer Information | M | | UP Transport Layer Information 9.3.2.1 | | — | — |
| >>>>PDU Session Data Forwarding Information Request | O | | Data Forwarding Information Request 9.3.2.5 | | — | — |
| >>>>PDU Session Inactivity Timer | O | | Inactivty Timer 9.3.1.54 | Included if the Activity Level Notification is set to PDU Session. | — | — |
| >>>>DRB To Setup List | | 1 | | | — | — |
| >>>>>DRB To Setup Item | | 1 . . . <maxnoof DRBs> | | | — | — |
| >>>>>>DRB ID | M | | 9.3.1.16 | | — | — |
| >>>>>>SDAP Configuration | M | | 9.3.1.39 | | — | — |
| >>>>>>PDCP Configuration | M | | 9.3.1.38 | | — | — |
| >>>>>>Cell Group Information | M | | 9.3.1.11 | The gNB-CU-UP shall provide one UL UP Transport Layer Information Item per cell group entry. | — | — |
| >>>>>>Flow Mapping Information | M | | QoS Flow QoS Parameters List 9.3.1.25 | | — | — |
| >>>>>>DRB Data forwarding information Request | O | | Data Forwarding Information Request 9.3.2.5 | | — | — |
| >>>>>>DRB Inactivity Timer | O | | Inactivty Timer 9.3.1.54 | Included if the Activity Level Notification is set to DRB. | — | — |
| >>>>>>PDCP UL Count | O | | PDCP Count 9.3.1.35 | PDCP count for first unacknowledged UL packet. | — | — |
| >>>>>>PDCP DL Count | O | | PDCP Count 9.3.1.35 | PDCP count for next DL packet to be assigned. | — | — |
| >>PDU Session Resource To Modify List | | 0 . . . 1 | | | YES | reject |
| >>>PDU Session Resource To Modify Item | | 1 . . . <maxnoof PDUSession Resource> | | | — | — |
| >>>>PDU Session ID | M | | 9.3.1.21 | | — | — |
| >>>>PDU Session Type | O | | 9.3.1.22 | | — | — |
| >>>>S-NSSAI | O | | 9.3.1.9 | | — | — |
| >>>>Security Indication | O | | 9.3.1.23 | | — | — |
| >>>>PDU Session Resource DL Aggregate Maximum Bit Rate | O | | 9.3.1.20 | | — | — |
| >>>>NG UL UP Transport Layer Information | O | | UP Transport Layer Information 9.3.2.1 | | — | — |
| >>>>PDU Session Data Forwarding Information Request | O | | Data Forwarding Information Request 9.3.2.5 | | — | — |
| >>>>PDU Session Inactivity Timer | O | | Inactivty Timer 9.3.1.54 | Included if the Activity Level Notification is set to PDU Session. | — | — |
| >>>>DRB To Setup List | | 0 . . . 1 | | | — | — |
| >>>>>DRB To Setup Item | | 1 . . . <maxnoof DRBs> | | | — | — |

TABLE 1-continued

| IE/Group Name | Presence | Range | IE type and reference | Semantics description | Criticality | Assigned Criticality |
|---|---|---|---|---|---|---|
| >>>>>>DRB ID | M | | 9.3.1.16 | | — | — |
| >>>>>>SDAP Configuration | M | | 9.3.1.39 | | — | — |
| >>>>>>PDCP Configuration | M | | 9.3.1.38 | | — | — |
| >>>>>>Cell Group Information | M | | 9.3.1.11 | | — | — |
| >>>>>>Flow Mapping Information | M | | QoS Flow QoS Parameters List9.3.1.25 | | | |
| >>>>>>DRB Data Forwarding Information Request | O | | Data Forwarding Information Request 9.3.2.5 | | — | — |
| >>>>>>DRB Inactivity Timer | O | | Inactivty Timer 9.3.1.54 | Included if the Activity Level Notification is set to DRB. | — | — |
| >>>>>>PDCP UL Count | O | | PDCP Count 9.3.1.35 | PDCP count for first unacknowledged UL packet. | — | — |
| >>>>>>PDCP DL Count | O | | PDCP Count 9.3.1.35 | PDCP count for next DL packet to be assigned. | — | — |
| >>>>DRB To Modify List | | 0 . . . 1 | | | — | — |
| >>>>>DRB To Modify Item | | 1 . . . <maxnoof DRBs> | | | — | — |
| >>>>>>DRB ID | M | | 9.3.1.16 | | — | — |
| >>>>>>SDAP Configuration | O | | 9.3.1.39 | | — | — |
| >>>>>>PDCP Configuration | O | | 9.3.1.38 | | — | — |
| >>>>>>DRB Data forwarding information Request | O | | Data Forwarding Information Request 9.3.2.5 | Overrides previous information. | — | — |
| >>>>>>PDCP Count Request | O | | ENUMERATED (requested, . . . ) | The gNB-CU-CP requests the gNB-CU-UP to provide the PDCP Count in the response message. | — | — |
| >>>>>>PDCP UL Count | O | | PDCP Count9.3.1.35 | PDCP count for first unacknowledged UL packet. | — | — |
| >>>>>>PDCP DL Count | O | | PDCP Count 9.3.1.35 | PDCP count for next DL packet to be assigned. | — | — |
| >>>>>>DL UP Parameters | O | | 9.3.1.13 | | — | — |
| >>>>>>Cell Group To Add | O | | 9.3.1.11 | | — | — |
| >>>>>>Cell Group To Modify | O | | 9.3.1.11 | | — | — |
| >>>>>>Cell Group To Remove | O | | 9.3.1.11 | | — | — |
| >>>>>>Flow Mapping Information | O | | QoS Flow QoS Parameters List 9.3.1.25 | Overrides previous mapping information. | — | — |
| >>>>>>DRB Inactivity Timer | O | | Inactivty Timer 9.3.1.54 | Included if the Activity Level Notification is set to DRB. | — | — |
| >>>>DRB To Remove List | | 0 . . . 1 | | | — | — |
| >>>>>DRB To Remove Item | | 1 . . . <maxnoof DRBs> | | | — | — |
| >>>>>>DRB ID | M | | 9.3.1.16 | | — | — |
| >>PDU Session Resource To Remove List | | 0 . . . 1 | | | YES | reject |
| >>>PDU Session Resource To Remove Item | | 1 . . . <maxnoof PDUSession Resource> | | | — | — |
| >>>>PDU Session ID | M | | 9.3.1.21 | | — | — |

In Table 1, "Data Discard Required" IE in the BEARER CONTEXT MODIFICATION REQUEST message is the buffered data discard indication. If the Data Discard Required IE is contained in the BEARER CONTEXT MODIFICATION REQUEST message and the value is set to "Required", the gNB-CU-UP shall discard the user plane data for that UE and consider that the bearer context is still suspended.

Figure 7:
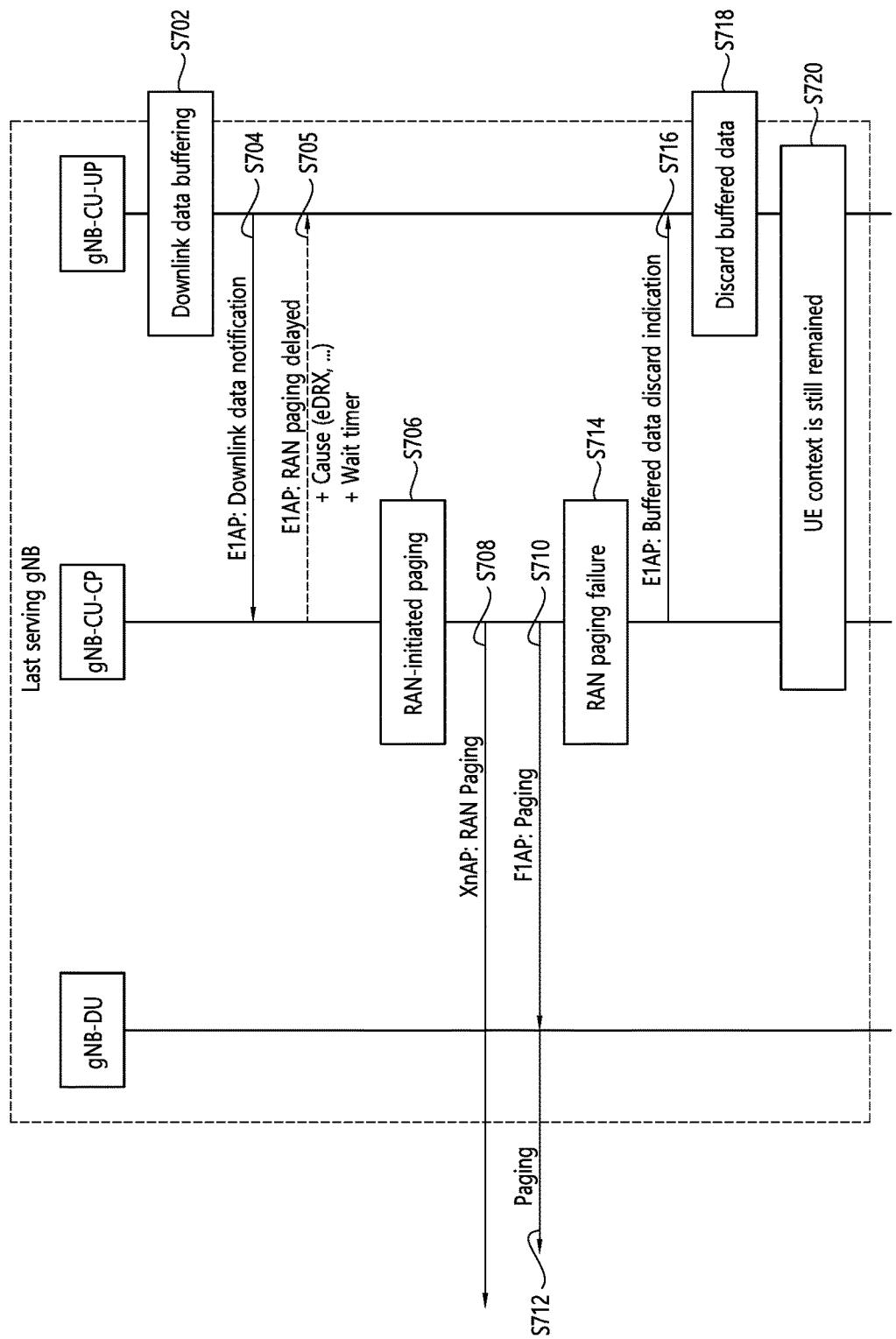
FIG. 7 shows an overall procedure for RAN paging failure according to the embodiment 1-1 of the present invention.

FIG. 7 shows an overall procedure for RAN paging failure according to the embodiment 1-1 of the present invention. FIG. 7 shows a procedure for RAN paging failure when the gNB-CU-CP decides to keep NG connection active and to discard buffered DL data.

The UE is in RRC_INACTIVE. The UE and last serving gNB-CU store the UE context. The NG-C connection between last serving gNB-CU-CP and AMF is maintained. In addition, the NG-U connection between last serving gNB-CU-UP and UPF is maintained. The F1 connection between last serving gNB-CU and gNB-DU is disconnected.

Step S702: When the last serving gNB-CU-UP receives DL data for a PDU session related to the UE in RRC_INACTIVE and there is no F1-DL tunnel endpoint identifiers (TEIDs) stored in last serving gNB-CU-UP for the PDU session, the last serving gNB-CU-UP buffers the DL data.

Step S704: On arrival of the first DL data packet for any quality of service (QoS) flow, the last serving gNB-CU-UP shall send DOWNLINK DATA NOTIFICATION message to the last serving gNB-CU-CP via E1 interface. This message may include the information to identify the QoS flow for the DL data packet in order to support the paging policy differentiation feature in gNB.

Step S705: When the last serving gNB-CU-CP detects that the UE is not reachable for paging temporarily (e.g. if enhanced DRX (eDRX) is used, or the UE is reachable only for regulatory prioritized service, etc.), the last serving gNB-CU-CP sends RAN PAGING DELAYED message to the last serving gNB-CU-UP via E1 interface. The RAN PAGING DELAYED message may contain the Cause Value IE and the Wait Time IE in order to request extended buffering. The Cause Value IE is used to indicate the reason that the DOWNLINK DATA NOTIFICATION message has been temporarily rejected. The Wait Time IE is the expected time before radio bearers can be established/resumed to the UE.

The Cause Value IE and Wait Time IE may be sent to the last serving gNB-CU-UP via a response message to the DOWNLINK DATA NOTIFICATION message.

Step S706: Upon receiving the DOWNLINK DATA NOTIFICATION message from the last serving gNB-CU-UP in Step S704, the last serving gNB-CU-CP initiates the RAN paging to find the UE in the RAN-based notification area. If the paging policy differentiation is configured by the AMF, the RAN Paging Priority IE mapped to the information to identify the QoS flow for the DL data packet in the DOWNLINK DATA NOTIFICATION message may be included into the RAN PAGING message.

Step S708: The last serving gNB CU-CP sends the RAN PAGING message via the Xn interface to the neighbor gNBs in same RAN-based notification area.

Step S710-S712: Each gNB-CU in same RAN-based notification area sends PAGING message via F1 interface to gNB-DU. If the RAN Paging Priority IE is included in the RAN PAGING message, the gNB-CU-CP may use it to prioritize paging. Then, each gNB-DU sends Paging message to the UE.

Step S714: If the last serving gNB-CU-CP receives no response from the UE to the Paging message (e.g. Timer expiry for procedure, etc.), the last serving gNB-CU-CP considers the RAN paging failure for that UE. Based on local configuration, the last serving gNB-CU-CP may keep the NG connection active or initiate the UE context release request procedure.

Step S716: When the last serving gNB-CU-CP decides to keep the NG connection active, the last serving gNB-CU-CP sends buffered data discard indication to the last serving gNB-CU-UP via E1 interface. The buffered data discard indication may indicate that the UE is not reachable. The buffered data discard indication may be the E1AP message BUFFERED DATA DISCARD. Or, the buffered data discard indication may be an IE in the BEARER CONTEXT MODIFICATION REQUEST message. The buffered data discard indication may also be used to indicate to the last serving gNB-CU-UP to immediately discard the buffered DL data and continue to store the UE context related to paging failure.

When the last serving gNB-CU-CP decides to let the UE enter into RRC_IDLE, the last serving gNB-CU-CP sends the UE CONTEXT RELEASE REQUEST message to the AMF via NG interface. Also, the last serving gNB-CU-CP triggers the bearer context release procedure by sending the BEARER CONTEXT RELEASE COMMAND message to the last serving gNB-CU-UP via E1 interface. In this case, the last serving gNB-CU-UP deletes the UE context and discards the buffered DL data. In this case, steps S718 and S720 below should be skipped.

Step S718: Upon receiving the buffered data discard indication from the last serving gNB-CU-CP, the last serving gNB-CU-UP discards the buffered DL data for that UE.

Step S720: The UE is still in RRC_INACTIVE. The UE and last serving gNB-CU keeps storing the UE context. Accordingly, the UE context is still remained/suspended. The NG-C connection between last serving gNB-CU-CP and AMF is maintained. In addition, the NG-U connection between last serving gNB-CU-UP and UPF is maintained.

According to the embodiment 1-1 of the present invention described in FIGS. 6 and 7, for the RAN paging failure, the gNB-CU-CP can efficiently control whether to keep the NG connection active without deleting the stored UE context, or to release the NG connection with deleting the stored UE context.

Figure 8:
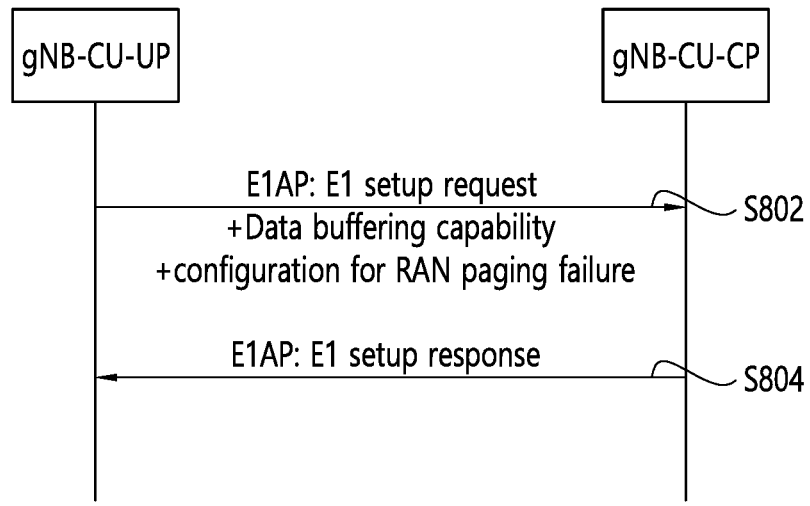
FIG. 8 shows E1 setup procedure considering data buffering according to the embodiment 1-1 of the present invention.

FIG. 8 shows E1 setup procedure considering data buffering according to the embodiment 1-1 of the present invention.

Step S802: The gNB-CU-UP initiates the procedure by sending an E1 SETUP REQUEST message including the appropriate data to the gNB-CU-CP via E1 interface. The E1 SETUP REQUEST message may contain the Data Buffering Capability IE to indicate the information related to the data buffering in the gNB-CU-UP (e.g. buffer size, maximum extended buffering time, etc.) and Configuration for RAN Paging Failure IE to inform how gNB-CU-UP is configured by operation and maintenance (OAM) for the RAN paging failure (e.g. NG connection release, data discard, etc.).

Step S804: The gNB-CU-CP responds with an E1 SETUP RESPONSE message including the appropriate data.

The Data Buffering Capability IE and Configuration for RAN Paging Failure IE may be delivered to the gNB-CU-CP by the gNB-CU-CP triggered and gNB-CU-UP triggered Configuration Update procedure over the E1 interface.

2. Embodiment 1-2

According to the embodiment 1-2 of the present invention, when the last serving gNB-CU-UP is capable of deciding to keep the NG connection active and to discard the buffered DL data only, the last serving gNB-CU-CP just informs the last serving gNB-CU-UP of the RAN paging failure. The last serving gNB-CU-UP determines to discard the buffered DL data based on the RAN paging failure indication and then indicates to the last serving gNB-CU-CP that the buffered DL data is discarded and the UE context is still kept.

Figure 9:
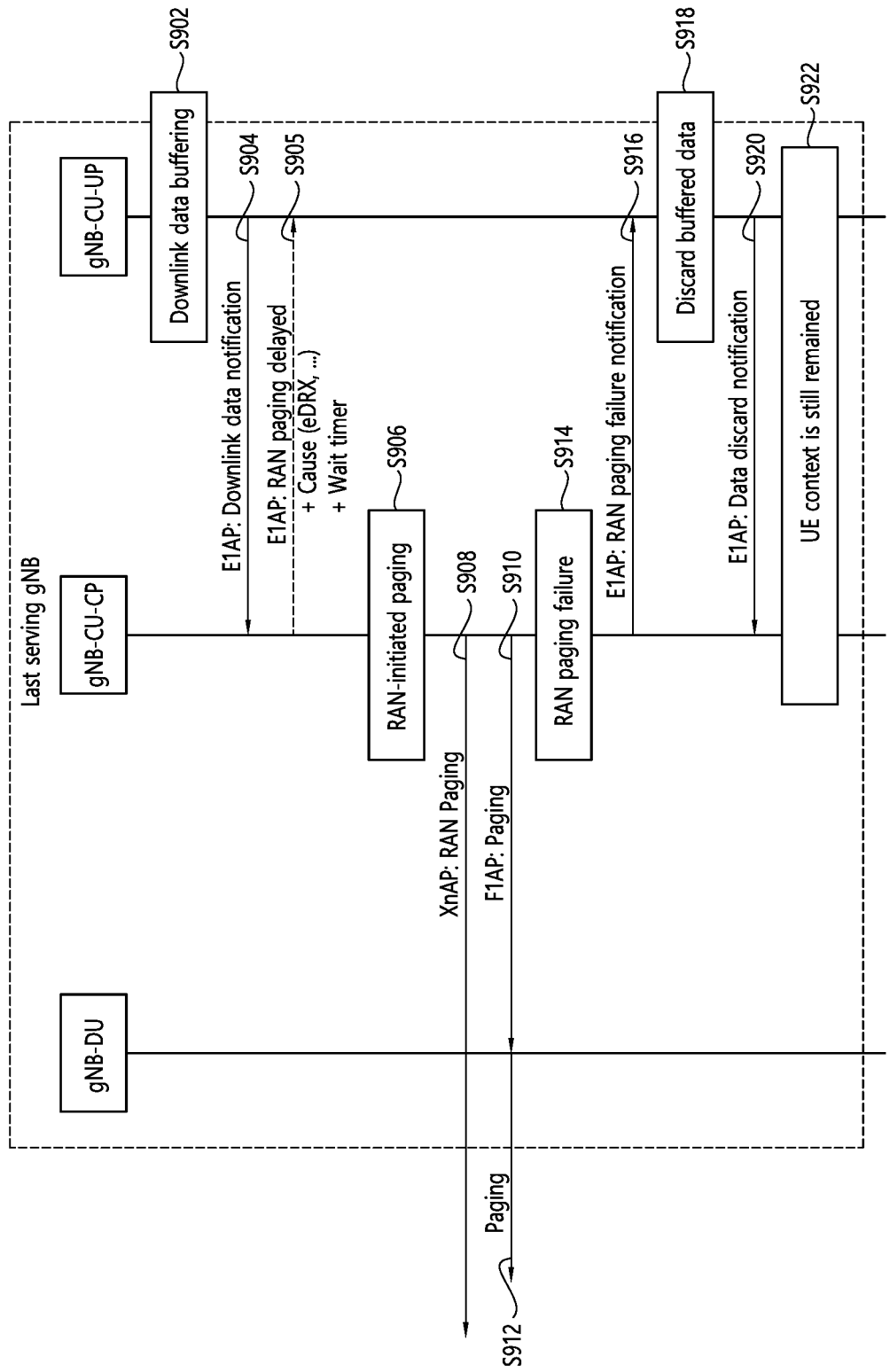
FIG. 9 shows an overall procedure for RAN paging failure according to the embodiment 1-2 of the present invention.

FIG. 9 shows an overall procedure for RAN paging failure according to the embodiment 1-2 of the present invention. FIG. 9 shows a procedure for RAN paging failure when the gNB-CU-UP decides to keep NG connection active and to discard buffered DL data.

The UE is in RRC_INACTIVE. The UE and last serving gNB-CU store the UE context. The NG-C connection between last serving gNB-CU-CP and AMF is maintained. In addition, the NG-U connection between last serving gNB-CU-UP and UPF is maintained. The F1 connection between last serving gNB-CU and gNB-DU is disconnected.

Step S902: When the last serving gNB-CU-UP receives DL data for a PDU session related to the UE in RRC_INACTIVE and there is no F1-DL TEIDs stored in last serving gNB-CU-UP for the PDU session, the last serving gNB-CU-UP buffers the DL data.

Step S904: On arrival of the first DL data packet for any QoS flow, the last serving gNB-CU-UP shall send DOWNLINK DATA NOTIFICATION message to the last serving gNB-CU-CP via E1 interface. This message may include the information to identify the QoS flow for the DL data packet in order to support the paging policy differentiation feature in gNB.

Step S905: When the last serving gNB-CU-CP detects that the UE is not reachable for paging temporarily (e.g. if eDRX is used, or the UE is reachable only for regulatory prioritized service, etc.), the last serving gNB-CU-CP sends RAN PAGING DELAYED message to the last serving gNB-CU-UP via E1 interface. The RAN PAGING DELAYED message may contain the Cause Value IE and the Wait Time IE in order to request extended buffering. The Cause Value IE is used to indicate the reason that the DOWNLINK DATA NOTIFICATION message has been temporarily rejected. The Wait Time IE is the expected time before radio bearers can be established/resumed to the UE.

The Cause Value IE and Wait Time IE may be sent to the last serving gNB-CU-UP via a response message to the DOWNLINK DATA NOTIFICATION message.

Step S906: Upon receiving the DOWNLINK DATA NOTIFICATION message from the last serving gNB-CU-UP in Step S904, the last serving gNB-CU-CP initiates the RAN paging to find the UE in the RAN-based notification area. If the paging policy differentiation is configured by the AMF, the RAN Paging Priority IE mapped to the information to identify the QoS flow for the DL data packet in the DOWNLINK DATA NOTIFICATION message may be included into the RAN PAGING message.

Step S908: The last serving gNB CU-CP sends the RAN PAGING message via the Xn interface to the neighbor gNBs in same RAN-based notification area.

Step S910-S912: Each gNB-CU in same RAN-based notification area sends PAGING message via F1 interface to gNB-DU. If the RAN Paging Priority IE is included in the RAN PAGING message, the gNB-CU-CP may use it to prioritize paging. Then, each gNB-DU sends Paging message to the UE.

Step S914: If the last serving gNB-CU-CP receives no response from the UE to the Paging message (e.g. Timer expiry for procedure, etc.), the last serving gNB-CU-CP considers the RAN paging failure for that UE.

Step S916: The last serving gNB-CU-CP then sends the RAN PAGING FAILURE NOTIFICATION message to the last serving gNB-CU-UP via E1 interface to indicate that the UE is not reachable.

Step S918: Upon receiving the RAN PAGING FAILURE NOTIFICATION message from the last serving gNB-CU-CP, based on local configuration, the last serving gNB-CU-UP may keep the NG connection active or initiate the UE context request release procedure. When the last serving gNB-CU-UP decides to keep the NG connection active, the last serving gNB-CU-UP just discards the buffered DL data for that UE.

When the last serving gNB-CU-UP decides to let the UE enter into RRC_IDLE, the last serving gNB-CU-UP triggers the bearer context release request procedure to request to the last serving gNB-CU-CP the release of suspended radio bearers (RBs) for that UE. In this case, steps S920 and S922 below should be skipped.

Step S920: When the last serving gNB-CU-UP decides to keep the NG connection active, the last serving gNB-CU-UP responds with the DATA DISCARDED NOTIFICATION message via E1 interface to indicate the buffered DL data is discarded and the UE context is still kept.

Step S922: The UE is still in RRC_INACTIVE. The UE and last serving gNB-CU keeps storing the UE context. Accordingly, the UE context is still remained/suspended. The NG-C connection between last serving gNB-CU-CP and AMF is maintained. In addition, the NG-U connection between last serving gNB-CU-UP and UPF is maintained.

According to the embodiment 1-2 of the present invention described in FIG. 9, for the RAN paging failure, the gNB-CU-UP can efficiently control whether to keep the NG connection active without deleting the stored UE context, or to release the NG connection with deleting the stored UE context. However, additional E1 AP signaling may be needed compared to the embodiment 1-1 of the present invention described above.

Meanwhile, there may be a problem when the UE transits from RRC_INACTIVE to RRC_CONNECTED for the mobile-terminated (MT) data. When there is DL data sent to the UE, the last serving gNB-CU which stores the UE context may trigger the RAN-initiated paging in the RAN-based notification area in order to contact with the UE. Upon receiving the Paging message, the UE responds to the gNB for the paging. Then, the gNB-CU-CP initiates the procedure to resume the suspended RBs to transmit the MT data for the UE. In this procedure, since the RRC and PDCP-C are hosted at the gNB-CU-CP, the gNB-CU-UP does not know the actual RRC state of the UE. In addition, the gNB-CU-UP is difficult to know the time when the RRC RESUME message is sent to the UE without notification from the gNB-CU-CP. Therefore, the gNB-CU-UP just starts to forward the MT data towards the UE when it is informed of the F1-DL TEIDs. However, the UE can receive the DL data only when the UE enters into RRC_CONNECTED by receiving the RRC Resume message from the gNB-CU-CP. If the DL data is arrived at the UE before the RRC state transition from RRC_INACTIVE to RRC_CONNECTED is completed, the arrived DL data is just discarded, thus causing the unnecessary data retransmission from the NGC.

Therefore, how the gNB-CU-CP informs the gNB-CU-UP of when starting to forward the MT data towards the UE should be discussed. A method for efficiently supporting the UE's state transition from RRC_INACTIVE to RRC_CONNECTED or RRC_IDLE, depending on the success or failure for the RAN-initiated paging for the MT data may be proposed according to the present invention.

3. Embodiment 2-1

According to the embodiment 2-1 of the present invention, the gNB-CU-CP prevents the gNB-CU-UP from forwarding the buffered DL data towards the UE. When the gNB-CU-CP is aware of the UE's successful state transition to RRC_CONNECTED, the gNB-CU-CP informs the gNB-CU-UP of being allowed to transmit the buffered DL data towards the UE. For the case where the UE is temporarily unreachable for paging, the gNB-CU-CP may also indicate to the gNB-CU-UP that extended buffering is needed.

Figure 10:
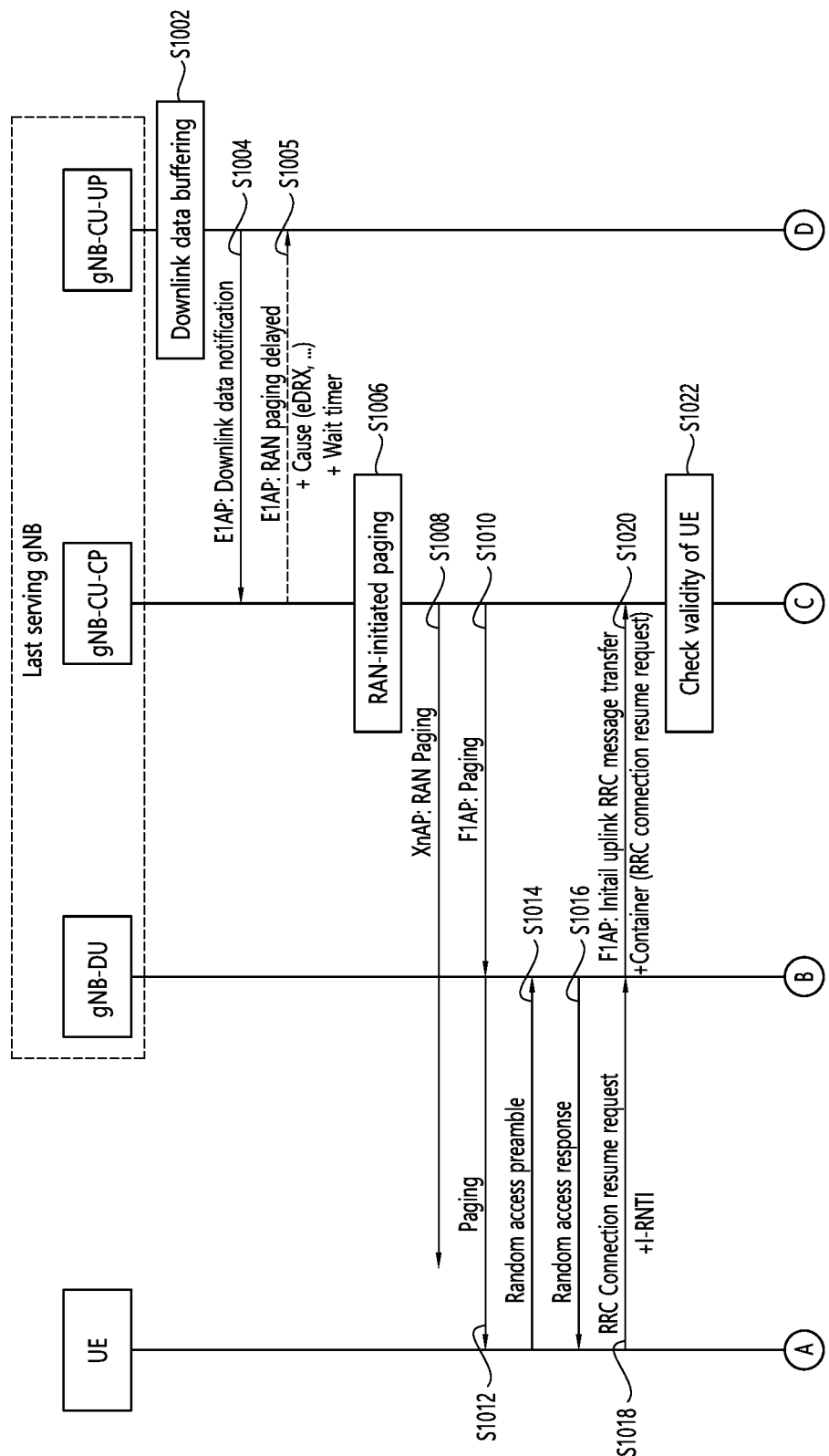
FIG. 10 shows an overall procedure according to the embodiment 2-1 of the present invention.

FIG. 10 shows an overall procedure according to the embodiment 2-1 of the present invention. FIG. 10 shows a first part of the procedure for successful RRC connection resume with DL data buffering in gNB-CU-UP when the UE accesses to the last serving gNB.

The UE is in RRC_INACTIVE. The UE and last serving gNB-CU store the UE context. The NG-C connection between last serving gNB-CU-CP and AMF is maintained. In addition, the NG-U connection between last serving gNB-CU-UP and UPF is maintained. The F1 connection between last serving gNB-CU and gNB-DU is disconnected.

Step S1002: When the last serving gNB-CU-UP receives DL data for a PDU session related to the UE in RRC_INACTIVE and there is no F1-DL TEIDs stored in last serving gNB-CU-UP for the PDU session, the last serving gNB-CU-UP buffers the DL data.

Step S1004: On arrival of the first DL data packet for any QoS flow, the last serving gNB-CU-UP shall send DOWNLINK DATA NOTIFICATION message to the last serving gNB-CU-CP via E1 interface. This message may include the information to identify the QoS flow for the DL data packet in order to support the paging policy differentiation feature in gNB.

Step S1005: When the last serving gNB-CU-CP detects that the UE is not reachable for paging temporarily (e.g. eDRX is used, or the UE is reachable only for regulatory prioritized service, etc.), the last serving gNB-CU-CP sends RAN PAGING DELAYED message to the last serving gNB-CU-UP via E1 interface. The RAN PAGING DELAYED message may contain the Cause Value IE and the Wait Time IE in order to request extended buffering. The Cause Value IE is used to indicate the reason that the DOWNLINK DATA NOTIFICATION message has been temporarily rejected. The Wait Time IE is the expected time before radio bearers can be established/resumed to the UE.

The Cause Value IE and Wait Time IE may be sent to the last serving gNB-CU-UP via a response message to the DOWNLINK DATA NOTIFICATION message.

Step S1006: Upon receiving the DOWNLINK DATA NOTIFICATION message from the last serving gNB-CU-UP in Step S1004, the last serving gNB-CU-CP initiates the RAN paging to find the UE in the RAN-based notification area. If the paging policy differentiation is configured by the AMF, the RAN Paging Priority IE mapped to the information to identify the QoS flow for the DL data packet in the DOWNLINK DATA NOTIFICATION message may be included into the RAN PAGING message.

Step S1008: The last serving gNB CU-CP sends the RAN PAGING message via the Xn interface to the neighbor gNBs in same RAN-based notification area.

Step S1010-S1012: Each gNB-CU in same RAN-based notification area sends PAGING message via F1 interface to gNB-DU. If the RAN Paging Priority IE is included in the RAN PAGING message, the gNB-CU-CP may use it to prioritize paging. Then, each gNB-DU sends Paging message to the UE. In this case, the Paging message sent by the last serving gNB-DU is reached to the UE.

Step S1014: Since the UE in RRC_INACTIVE needs to transit to RRC_CONNECTED, the UE first sends the random access preamble or new message to the gNB-DU.

Step S1016: Upon receiving the random access preamble from the UE, the gNB-DU then responds with random access response.

Step S1018: In order to resume the RRC connection, the UE sends the RRC Resume Request message (or new message) to the gNB-DU. The RRC Resume Request message also includes the inactive radio network temporary identifier (I-RNTI) to identify the UE context in the last serving gNB-CU.

Step S1020: Upon reception of the RRC Resume Request message (or new message), the gNB-DU sends the INITIAL UPLINK RRC MESSAGE TRANSFER message (or new message) to the last serving gNB-CU-CP via F1 interface. The INITIAL UPLINK RRC MESSAGE TRANSFER message may include the container which piggybacks the RRC Resume Request message.

Step S1022: Upon receiving the INITIAL UPLINK RRC MESSAGE TRANSFER message including the container for the RRC Resume Request message including the I-RNTI, the last serving gNB-CU-CP checks whether it is able to find the UE context related to the I-RNTI or not.

Figure 11:
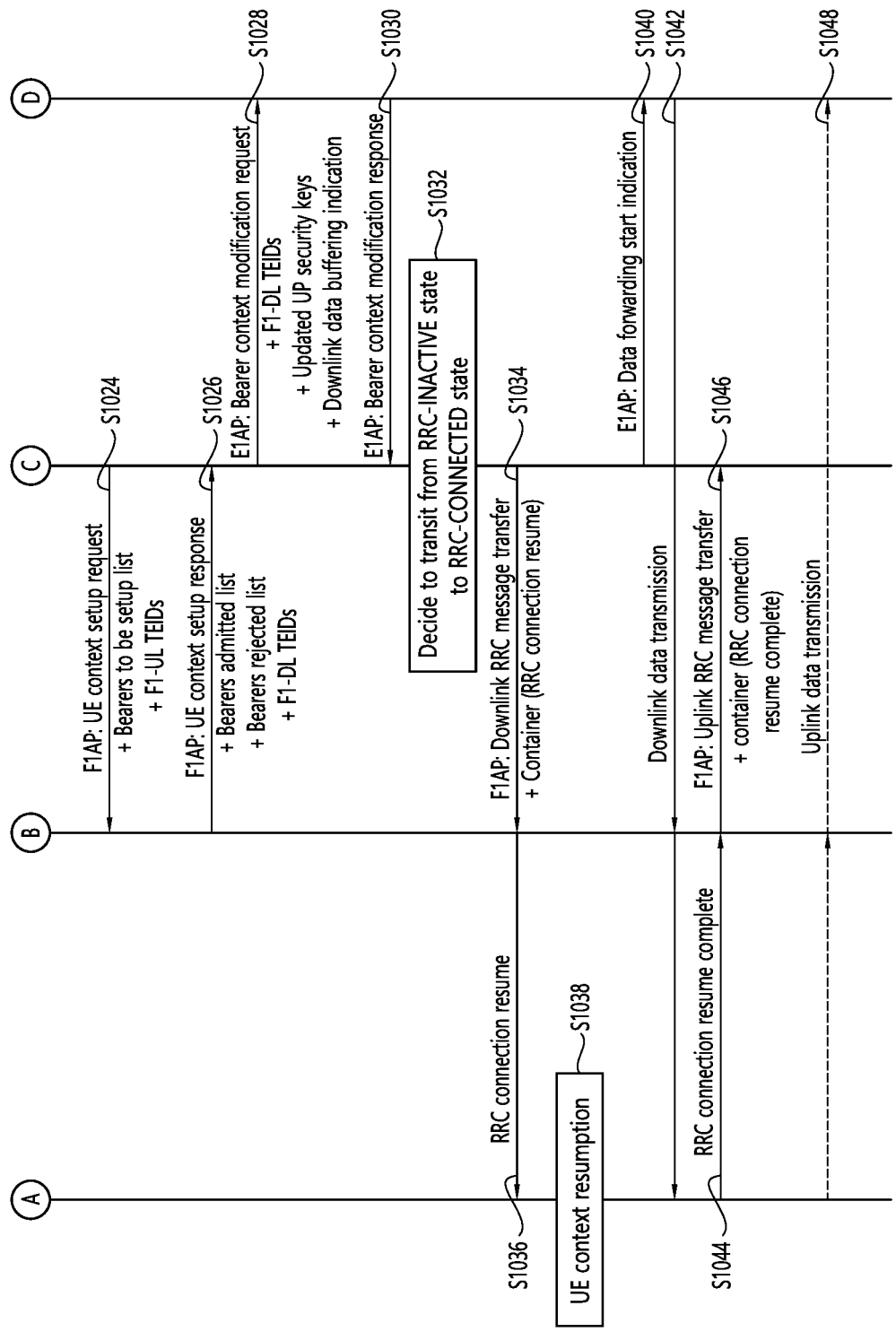
FIG. 11 shows an overall procedure according to the embodiment 2-1 of the present invention.

FIG. 11 shows an overall procedure according to the embodiment 2-1 of the present invention. FIG. 11 shows a second part of the procedure for successful RRC connection resume with DL data buffering in gNB-CU-UP when the UE accesses to the last serving gNB. FIG. 11 follows FIG. 10.

Step S1024: Provided that the I-RNTI exists and the authentication token is successfully validated, the last serving gNB-CU-CP allocates gNB-CU UE F1AP ID and decides to let the UE enter into RRC_CONNECTED to forward the buffered DL data. Based on the stored UE context, the last serving gNB-CU-CP sends the UE CONTEXT SETUP REQUEST message (or new message) to the gNB-DU via F1 interface. The UE CONTEXT SETUP REQUEST message (or new message) may include signaling RB (SRB) ID(s) and data RB (DRB) ID(s) to be setup (i.e. list of bearers to be setup), and also the UL TNL address information for F1-U (i.e. F1-UL TEIDs).

Step S1026: The gNB-DU responds with the UE CONTEXT SETUP RESPONSE message (or new message) to the last serving gNB-CU-CP via F1 interface. The UE CONTEXT SETUP RESPONSE message (or new message) contains RLC/MAC/PHY configuration of SRB and DRBs provided by the gNB-DU (i.e. list of bearers admitted/rejected), and also DL TNL address information for F1-U (i.e. F1-DL TEIDs).

Step S1028: The last serving gNB-CU-CP sends the BEARER CONTEXT MODIFICATION REQUEST message (or new message) to the last serving gNB-CU-UP via E1 interface. The BEARER CONTEXT MODIFICATION REQUEST message (or new message) contains the DL TNL address information for F1-U (i.e. F1-DL TEIDs). The BEARER CONTEXT MODIFICATION REQUEST message (or new message) may contain updated user plane keys (i.e. $K_{UPenc}$, $K_{UPint}$). The BEARER CONTEXT MODIFICATION REQUEST message (or new message) may contain the Downlink Data Buffering Indication IE and Resume Indication IE. Until the UE enters into RRC_CONNECTED, the Downlink Data Buffering Indication IE prevents the last serving gNB-CU-UP from transmitting the buffered DL data towards the UE. The Resume Indication IE is used to indicate to the last serving gNB-CU-UP that the RRC connection for the UE in the RRC_INACTIVE is resumed.

Step S1030: The last serving gNB-CU-UP responds with the BEARER CONTEXT MODIFICATION RESPONSE message (or new message) to the last serving gNB-CU-CP via E1 interface.

Step S1032: Upon receiving the BEARER CONTEXT MODIFICATION RESPONSE message (or new message) from the last serving gNB-CU-UP, the last serving gNB-CU-CP generates RRC Resume message (or new message) to notify the UE of transiting from RRC_INACTIVE to RRC_CONNECTED.

Step S1034: The last serving gNB-CU-CP sends the DOWNLINK RRC MESSAGE TRANSFER message (or new message) to the gNB-DU via F1 interface. The DOWNLINK RRC MESSAGE TRANSFER message (or new message) includes SRB ID and the container which piggybacks the RRC Resume message.

Step S1036: The gNB-DU forwards the RRC Resume message (or new message) to the UE over SRB1 indicated by the SRB ID.

Step S1038: The UE resumes all SRBs and DRBs based on the reconfiguration information in the RRC Resume message (or new message), and re-establishes the AS security. The UE is now in RRC_CONNECTED.

Step S1040: When the last serving gNB-CU-CP receives the hybrid automatic repeat request (HARQ) acknowledgement (ACK) for the RRC Resume message, the last serving gNB-CU-CP sends the DATA FORWARDING START INDICATION message to the last serving gNB-CU-UP via E1 interface to allow the last serving gNB-CU-UP to initiate the DL data transmission towards the UE from now on. The DATA FORWARDING START INDICATION message may be sent to the last serving gNB-CU-UP as soon as the last serving gNB-CU-CP sends the RRC Resume message to the UE, or as soon as the last serving gNB-CU-CP receives the RRC Resume Complete message from the UE.

Step S1042: Upon receiving the DATA FORWARDING START INDICATION message from the last serving gNB-CU-CP, the last serving gNB-CU-UP transmits the buffered DL data towards the UE via the gNB-DU.

Step S1044: Upon receiving the RRC Resume message (or new message) from the gNB-DU in Step S1036, the UE sends the RRC Resume Complete message (or new message) to the gNB-DU to confirm that the RRC connection was resumed successfully.

Step S1046: The gNB-DU sends the UPLINK RRC MESSAGE TRANSFER message (or new message) to the last serving gNB-CU-CP via F1 interface. The UPLINK RRC MESSAGE TRANSFER message (or new message) includes the container which piggybacks the RRC Resume Complete message.

Step S1048: If the UE has the UL data to be sent to the NGC, the UE may transmit the UL data to the UPF via the gNB-DU and last serving gNB-CU-UP.

The embodiment 2-1 of the present invention shown in FIGS. 10 and 11 have been described assuming that the UE accesses to the last serving gNB. However, the last serving gNB before UE transits to RRC_INACTIVE and the current gNB to which the UE would like to resume the connection may be different. When the UE accesses to new gNB in same RAN-based notification area (i.e. current gNB), the embodiment 2-1 of the present invention shown in FIGS. 10 and 11 may be modified as follows.

Step S1002 to S1012 are not modified. However, in this case, the Paging message sent by the current gNB-DU, not the last serving gNB-DU, is reached to the UE.

Step S1014 and S1016: Since the UE in RRC_INACTIVE needs to transit to RRC_CONNECTED, the UE first triggers the random access procedure to the current gNB-DU.

Step S1018: In order to resume the RRC connection, the UE sends the RRC Resume Request message (or new message) to the current gNB-DU. The RRC Resume Request message also includes the I-RNTI allocated by the last serving gNB. The I-RNTI is used to identify the UE context in the last serving gNB-CU.

Step S1020: Upon reception of the RRC Resume Request message (or new message), the current gNB-DU sends the INITIAL UPLINK RRC MESSAGE TRANSFER message (or new message) to the current gNB-CU-CP via F1 interface. The INITIAL UPLINK RRC MESSAGE TRANSFER message may include the container which piggybacks the RRC Resume Request message.

Step S1022: The current gNB-CU-CP, if able to resolve the gNB identity contained in the I-RNTI, requests the last serving gNB-CU-CP to provide the UE context by sending the RETRIEVE UE CONTEXT REQUEST message (or new message) via Xn interface. Upon receiving the RETRIEVE UE CONTEXT REQUEST message (or new message) including the I-RNTI from the current gNB-CU-CP, the last serving gNB-CU-CP checks whether it is able to find the UE context related to the I-RNTI or not.

Step S1024: Provided that the I-RNTI exists and the authentication token is successfully validated, the last serving gNB-CU-CP responds to the current gNB-CU-CP with the RETRIEVE UE CONTEXT RESPONSE message containing the UE context via Xn interface. The current gNB-CU-CP decides to let the UE enter into RRC_CONNECTED to forward the buffered DL data. Based on the UE context delivered from the last serving gNB-CU-CP, the current gNB-CU-CP sends the BEARER CONTEXT SETUP REQUEST message (or new message) to the current gNB-CU-UP via E1 interface. The BEARER CONTEXT SETUP REQUEST (or new message) contains UL TNL address information for NG-U to setup the bearer context in the current gNB-CU-UP. The current gNB-CU-CP also forwards the flow-to-DRB mapping, and also the SDAP and PDCP configuration to the current gNB-CU-UP. The current gNB-CU-UP responds with the BEARER CONTEXT SETUP RESPONSE message (or new message) to the current gNB-CU-CP via E1 interface. The BEARER CONTEXT SETUP RESPONSE message (or new message) contains the UL TNL address information for F1-U, and DL TNL address information for NG-U, and also DL TNL address information for Xn-U. The current gNB-CU-CP sends the UE CONTEXT SETUP REQUEST (or new message) to the current gNB-DU via F1 interface. The UE CONTEXT SETUP REQUEST (or new message) may include SRB ID(s) and DRB ID(s) to be setup (i.e. list of bearers to be setup), and also the UL TNL address information for F1-U (i.e. F1-UL TEIDs).

Step S1026: The current gNB-DU responds with the UE CONTEXT SETUP RESPONSE message (or new message) to the current gNB-CU-CP via F1 interface. The UE CONTEXT SETUP RESPONSE message (or new message) contains RLC/MAC/PHY configuration of SRB and DRBs provided by the gNB-DU (i.e. list of bearers admitted/rejected), and also DL TNL address information for F1-U (i.e. F1-DL TEIDs).

Step S1028: The current gNB-CU-CP sends the BEARER CONTEXT MODIFICATION REQUEST message (or new message) to the current gNB-CU-UP via E1 interface. The BEARER CONTEXT MODIFICATION REQUEST message (or new message) contains the DL TNL address information for F1-U (i.e. F1-DL TEIDs). The BEARER CONTEXT MODIFICATION REQUEST message (or new message) may contain updated user plane keys (i.e. $K_{UPenc}$, $K_{UPint}$). The BEARER CONTEXT MODIFICATION REQUEST message (or new message) may contain the Downlink Data Buffering Indication IE. Until the UE enters into RRC_CONNECTED, the Downlink Data Buffering Indication IE prevents the current gNB-CU-UP from transmitting the buffered DL data towards the UE.

Step S1030: The current gNB-CU-UP responds with the BEARER CONTEXT MODIFICATION RESPONSE message (or new message) to the current gNB-CU-CP via E1 interface.

Step S1032: Upon receiving the BEARER CONTEXT MODIFICATION RESPONSE message (or new message) from the current gNB-CU-UP, the current gNB-CU-CP generates RRC Resume message (or new message) to notify the UE of transiting from RRC_INACTIVE to RRC_CONNECTED.

Step S1034: The current gNB-CU-CP sends the DOWNLINK RRC MESSAGE TRANSFER message (or new message) to the current gNB-DU via F1 interface. The DOWNLINK RRC MESSAGE TRANSFER message (or new message) includes SRB ID and the container which piggybacks the RRC Resume message.

Step S1036: The current gNB-DU forwards the RRC Resume message (or new message) to the UE over SRB1 indicated by the SRB ID.

Step S1038 is not modified.

Step S1040: The current gNB-CU-CP sends the DATA FORWARDING ADDRESS INDICATION message to the last serving gNB-CU-CP via Xn interface to inform the last serving gNB-CU-CP of successfully established PDU Session Resource contexts to which DL user data pending at the last serving gNB-CU-UP can be forwarded. Upon receiving the DATA FORWARDING ADDRESS INDICATION message, the last serving gNB-CU-CP sends the BEARER CONTEXT RELEASE COMMAND message to the last serving gNB-CU-UP via E1 interface in order to forward pending DL user data to the indicated TNL addresses. The BEARER CONTEXT RELEASE COMMAND message contains the DL TNL address information for Xn-U. The last serving gNB-CU-UP responds with the BEARER CONTEXT RELEASE COMPLETE message. The last serving gNB-CU-UP forwards pending DL user data to the current gNB-CU-UP. Until receiving the DATA FORWARDING START INDICATION message from the current gNB-CU-CP, the current gNB-CU-UP buffers the DL data forwarded from the last serving gNB-CU-UP.

When the current gNB-CU-CP receives the HARQ-ACK for the RRC Resume message, the current gNB-CU-CP sends the DATA FORWARDING START INDICATION message to the current gNB-CU-UP via E1 interface to allow the current gNB-CU-UP to initiate the DL data transmission towards the UE from now on. The DATA FORWARDING START INDICATION message may be sent to the current gNB-CU-UP as soon as the current gNB-CU-CP sends the RRC Resume message to the UE, or as soon as the current gNB-CU-CP receives the RRC Resume Complete message from the UE.

Step S1042: Upon receiving the DATA FORWARDING START INDICATION message from the current gNB-CU-CP, the current gNB-CU-UP transmits the buffered DL data towards the UE via the current gNB-DU.

Step S1044: Upon receiving the RRC Resume message (or new message) from the current gNB-DU in Step S1036, the UE sends the RRC Resume Complete message (or new message) to the current gNB-DU to confirm that the RRC connection was resumed successfully.

Step S1046: The current gNB-DU sends the UPLINK RRC MESSAGE TRANSFER message (or new message) to the current gNB-CU-CP via F1 interface. The UPLINK RRC MESSAGE TRANSFER message (or new message) includes the container which piggybacks the RRC Resume Complete message.

Step S1048: The current gNB-CU performs path switch procedure with the NGC. The current gNB-CU-CP triggers the release of the UE resources at the last serving gNB-CU-CP.

According to the embodiment 2-1 of the present invention described in FIGS. 10 and 11, according to the delivery of the RRC Resume message, the gNB-CU-CP can efficiently control whether the gNB-CU-UP forwards the buffered DL data to the UE or not. Therefore, UE's experience can be enhanced since the loss of DL data can be avoided and the unnecessary latency due to the data retransmission can be reduced.

4. Embodiment 2-2

According to the embodiment 2-2 of the present invention, the gNB-CU-CP prevents the gNB-DU from forwarding the buffered DL data towards the UE. When the gNB-CU-CP is aware of the UE's successful state transition to RRC_CONNECTED, the gNB-CU-CP informs the gNB-DU of being allowed to transmit the buffered DL data towards the UE. The indication from the gNB-CU-CP enables the gNB-DU to start forwarding the buffered DL data to the UE when the gNB-DU detects that the RRC Resume message is successfully sent to the UE. For the case where the UE is temporarily unreachable for paging, the gNB-CU-CP may also indicate to the gNB-CU-UP that extended buffering is needed.

Figure 12:
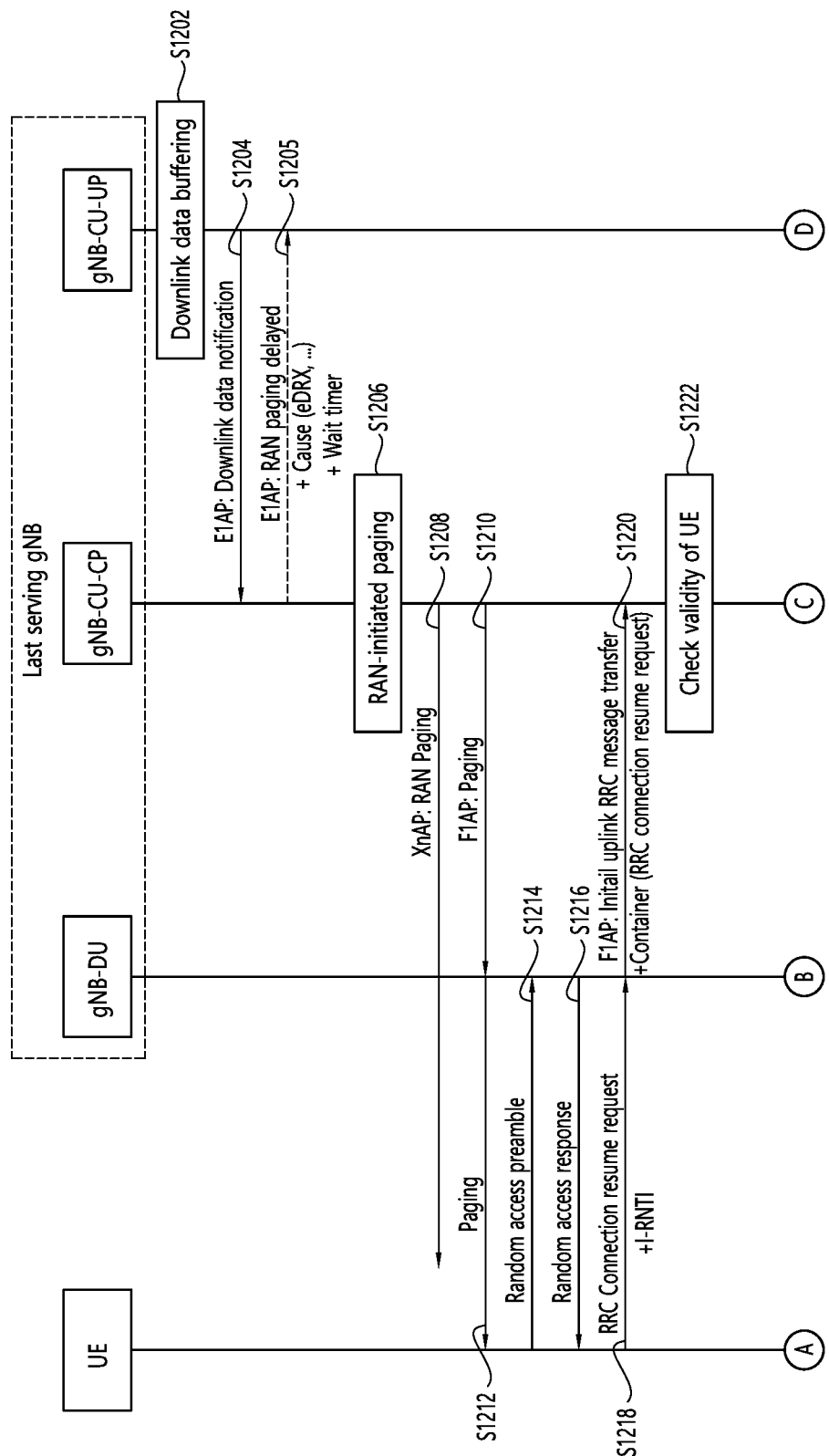
FIG. 12 shows an overall procedure according to the embodiment 2-2 of the present invention.

FIG. 12 shows an overall procedure according to the embodiment 2-2 of the present invention. FIG. 12 shows a first part of the procedure for successful RRC connection resume with DL data buffering in gNB-DU when the UE accesses to the last serving gNB.

The UE is in RRC_INACTIVE. The UE and last serving gNB-CU store the UE context. The NG-C connection between last serving gNB-CU-CP and AMF is maintained. In addition, the NG-U connection between last serving gNB-CU-UP and UPF is maintained. The F1 connection between last serving gNB-CU and gNB-DU is disconnected.

Step S1202: When the last serving gNB-CU-UP receives DL data for a PDU session related to the UE in RRC_INACTIVE and there is no F1-DL TEIDs stored in last serving gNB-CU-UP for the PDU session, the last serving gNB-CU-UP buffers the DL data.

Step S1204: On arrival of the first DL data packet for any QoS flow, the last serving gNB-CU-UP shall send DOWNLINK DATA NOTIFICATION message to the last serving gNB-CU-CP via E1 interface. This message may include the information to identify the QoS flow for the DL data packet in order to support the paging policy differentiation feature in gNB.

Step S1205: When the last serving gNB-CU-CP detects that the UE is not reachable for paging temporarily (e.g. eDRX is used, or the UE is reachable only for regulatory prioritized service, etc.), the last serving gNB-CU-CP sends RAN PAGING DELAYED message to the last serving gNB-CU-UP via E1 interface. The RAN PAGING DELAYED message may contain the Cause Value IE and the Wait Time IE in order to request extended buffering. The Cause Value IE is used to indicate the reason that the DOWNLINK DATA NOTIFICATION message has been temporarily rejected. The Wait Time IE is the expected time before radio bearers can be established/resumed to the UE.

The Cause Value IE and Wait Time IE may be sent to the last serving gNB-CU-UP via a response message to the DOWNLINK DATA NOTIFICATION message.

Step S1206: Upon receiving the DOWNLINK DATA NOTIFICATION message from the last serving gNB-CU-UP in Step S1204, the last serving gNB-CU-CP initiates the RAN paging to find the UE in the RAN-based notification area. If the paging policy differentiation is configured by the AMF, the RAN Paging Priority IE mapped to the information to identify the QoS flow for the DL data packet in the DOWNLINK DATA NOTIFICATION message may be included into the RAN PAGING message.

Step S1208: The last serving gNB CU-CP sends the RAN PAGING message via the Xn interface to the neighbor gNBs in same RAN-based notification area.

Step S1210-S1212: Each gNB-CU in same RAN-based notification area sends PAGING message via F1 interface to gNB-DU. If the RAN Paging Priority IE is included in the RAN PAGING message, the gNB-CU-CP may use it to prioritize paging. Then, each gNB-DU sends Paging message to the UE. In this case, the Paging message sent by the last serving gNB-DU is reached to the UE.

Step S1214: Since the UE in RRC_INACTIVE needs to transit to RRC_CONNECTED, the UE first sends the random access preamble or new message to the gNB-DU.

Step S1216: Upon receiving the random access preamble from the UE, the gNB-DU then responds with random access response.

Step S1218: In order to resume the RRC connection, the UE sends the RRC Resume Request message (or new message) to the gNB-DU. The RRC Resume Request message also includes the I-RNTI to identify the UE context in the last serving gNB-CU.

Step S1220: Upon reception of the RRC Resume Request message (or new message), the gNB-DU sends the INITIAL UPLINK RRC MESSAGE TRANSFER message (or new message) to the last serving gNB-CU-CP via F1 interface. The INITIAL UPLINK RRC MESSAGE TRANSFER message may include the container which piggybacks the RRC Resume Request message.

Step S1222: Upon receiving the INITIAL UPLINK RRC MESSAGE TRANSFER message including the container for the RRC Resume Request message including the I-RNTI, the last serving gNB-CU-CP checks whether it is able to find the UE context related to the I-RNTI or not.

FIG. 13 shows an overall procedure according to the embodiment 2-2 of the present invention. FIG. 13 shows a second part of the procedure for successful RRC connection resume with DL data buffering in gNB-DU when the UE accesses to the last serving gNB. FIG. 13 follows FIG. 12.

Step S1224: Provided that the I-RNTI exists and the authentication token is successfully validated, the last serving gNB-CU-CP allocates gNB-CU UE F1AP ID and decides to let the UE enter into RRC_CONNECTED to forward the buffered DL data. Based on the stored UE context, the last serving gNB-CU-CP sends the UE CONTEXT SETUP REQUEST message (or new message) to the gNB-DU via F1 interface. The UE CONTEXT SETUP REQUEST message (or new message) may include SRB ID(s) and DRB ID(s) to be setup (i.e. list of bearers to be setup), and also the UL TNL address information for F1-U (i.e. F1-UL TEIDs). The UE CONTEXT SETUP REQUEST message (or new message) may include the Downlink Data Buffering Indication IE. Until the UE enters into RRC_CONNECTED, the Downlink Data Buffering Indication IE prevents the gNB-DU from transmitting the buffered DL data towards the UE.

Step S1226: The gNB-DU responds with the UE CONTEXT SETUP RESPONSE message (or new message) to the last serving gNB-CU-CP via F1 interface. The UE CONTEXT SETUP RESPONSE message (or new message) contains RLC/MAC/PHY configuration of SRB and DRBs provided by the gNB-DU (i.e. list of bearers admitted/rejected), and also DL TNL address information for F1-U (i.e. F1-DL TEIDs).

Step S1228: The last serving gNB-CU-CP sends the BEARER CONTEXT MODIFICATION REQUEST message (or new message) to the last serving gNB-CU-UP via E1 interface. The BEARER CONTEXT MODIFICATION REQUEST message (or new message) contains the DL TNL address information for F1-U (i.e. F1-DL TEIDs). The BEARER CONTEXT MODIFICATION REQUEST message (or new message) may contain updated user plane keys (i.e. $K_{UPenc}$, $K_{UPint}$). The BEARER CONTEXT MODIFICATION REQUEST message (or new message) may contain Resume Indication IE. The Resume Indication IE is used to indicate to the last serving gNB-CU-UP that the RRC connection for the UE in the RRC_INACTIVE is resumed.

Step S1230: The last serving gNB-CU-UP responds with the BEARER CONTEXT MODIFICATION RESPONSE message (or new message) to the last serving gNB-CU-CP via E1 interface.

Step S1232: Since the last serving gNB-CU-UP is now aware of the F1-DL TEIDs for the PDU session(s), the last serving gNB-CU-UP initiates to forward the buffered DL data to the gNB-DU. The gNB-DU may buffer the DL data received from the last serving gNB-CU-UP.

Step S1234: Upon receiving the BEARER CONTEXT MODIFICATION RESPONSE message (or new message) from the last serving gNB-CU-UP, the last serving gNB-CU-CP generates RRC Resume message (or new message) to notify the UE of transiting from RRC_INACTIVE to RRC_CONNECTED.

Step S1236: The last serving gNB-CU-CP sends the DOWNLINK RRC MESSAGE TRANSFER message (or new message) to the gNB-DU via F1 interface. The DOWNLINK RRC MESSAGE TRANSFER message (or new message) includes SRB ID and the container which piggybacks the RRC Resume message. If the Data Forwarding Start Indication IE is included into the DOWNLINK RRC MESSAGE TRANSFER message (or new message), the gNB-DU starts transmitting the buffered DL data to the UE as soon as the HARQ-ACK for the RRC Resume message piggybacked in Step S1236 is received by the gNB-DU.

Alternatively, the last serving gNB-CU-CP may send the DATA FORWARDING START INDICATION message to the gNB-DU via F1 interface to allow the gNB-DU to transmit the buffered DL data to the UE.

Step S1238: The gNB-DU forwards the RRC Resume message (or new message) to the UE over SRB1 indicated by the SRB ID.

Step S1240: The UE resumes all SRBs and DRBs based on the reconfiguration information in the RRC Resume message (or new message), and re-establishes the AS security. The UE is now in RRC_CONNECTED.

Step S1242: If the Data Forwarding Start Indication IE is received in Step S1236, the gNB-DU starts transmitting the buffered DL data to the UE as soon as the HARQ-ACK for the RRC Resume message piggybacked in Step S1236 is received by the gNB-DU.

Alternatively, if the last serving gNB-CU-CP allows the gNB-DU to transmit the buffered DL data to the UE by sending the DATA FORWARDING START INDICATION message after Step S1246 describe below, the DL data transmission may be initiated at the gNB-DU after Step S1246.

Step S1244: Upon receiving the RRC Resume message (or new message) from the gNB-DU in Step S1236, the UE sends the RRC Resume Complete message (or new message) to the gNB-DU to confirm that the RRC connection was resumed successfully.

Step S1246: The gNB-DU sends the UPLINK RRC MESSAGE TRANSFER message (or new message) to the last serving gNB-CU-CP via F1 interface. The UPLINK RRC MESSAGE TRANSFER message (or new message) includes the container which piggybacks the RRC Resume Complete message.

Step S1248: If the UE has the UL data to be sent to the NGC, the UE may transmit the UL data to the UPF via the gNB-DU and last serving gNB-CU-UP.

The embodiment 2-2 of the present invention shown in FIGS. 12 and 13 have been described assuming that the UE accesses to the last serving gNB. However, the last serving gNB before UE transits to RRC_INACTIVE and the current gNB to which the UE would like to resume the connection may be different. When the UE accesses to new gNB in same RAN-based notification area (i.e. current gNB), the embodiment 2-2 of the present invention shown in FIGS. 12 and 13 may be modified as follows.

Step S1202 to S1212 are not modified. However, in this case, the Paging message sent by the current gNB-DU, not the last serving gNB-DU, is reached to the UE.

Step S1214: Since the UE in RRC_INACTIVE needs to transit to RRC_CONNECTED, the UE first sends the random access preamble or new message to the gNB-DU.

Step S1216: Upon receiving the random access preamble from the UE, the gNB-DU then responds with random access response.

Step S1218: In order to resume the RRC connection, the UE sends the RRC Resume Request message (or new message) to the gNB-DU. The RRC Resume Request message also includes the I-RNTI to identify the UE context in the last serving gNB-CU.

Step S1220: Upon reception of the RRC Resume Request message (or new message), the gNB-DU sends the INITIAL UPLINK RRC MESSAGE TRANSFER message (or new message) to the last serving gNB-CU-CP via F1 interface. The INITIAL UPLINK RRC MESSAGE TRANSFER message may include the container which piggybacks the RRC Resume Request message.

Step S1222: Upon receiving the INITIAL UPLINK RRC MESSAGE TRANSFER message including the container for the RRC Resume Request message including the I-RNTI, the last serving gNB-CU-CP checks whether it is able to find the UE context related to the I-RNTI or not.

Step S1214 and S1216: Since the UE in RRC_INACTIVE needs to transit to RRC_CONNECTED, the UE first triggers the random access procedure to the current gNB-DU.

Step S1218: In order to resume the RRC connection, the UE sends the RRC Resume Request message (or new message) to the current gNB-DU. The RRC Resume Request message also includes the I-RNTI allocated by the last serving gNB. The I-RNTI is used to identify the UE context in the last serving gNB-CU.

Step S1220: Upon reception of the RRC Resume Request message (or new message), the current gNB-DU sends the INITIAL UPLINK RRC MESSAGE TRANSFER message (or new message) to the current gNB-CU-CP via F1 interface. The INITIAL UPLINK RRC MESSAGE TRANSFER message may include the container which piggybacks the RRC Resume Request message.

Step S1222: The current gNB-CU-CP, if able to resolve the gNB identity contained in the I-RNTI, requests the last serving gNB-CU-CP to provide the UE context by sending the RETRIEVE UE CONTEXT REQUEST message (or new message) via Xn interface. Upon receiving the RETRIEVE UE CONTEXT REQUEST message (or new message) including the I-RNTI from the current gNB-CU-CP, the last serving gNB-CU-CP checks whether it is able to find the UE context related to the I-RNTI or not.

Step S1224: Provided that the I-RNTI exists and the authentication token is successfully validated, the last serving gNB-CU-CP responds to the current gNB-CU-CP with the RETRIEVE UE CONTEXT RESPONSE message containing the UE context via Xn interface. The current gNB-CU-CP decides to let the UE enter into RRC_CONNECTED to forward the buffered DL data. Based on the UE context delivered from the last serving gNB-CU-CP, the current gNB-CU-CP sends the BEARER CONTEXT SETUP REQUEST message (or new message) to the current gNB-CU-UP via E1 interface. The BEARER CONTEXT SETUP REQUEST (or new message) contains UL TNL address information for NG-U to setup the bearer context in the current gNB-CU-UP. The current gNB-CU-CP also forwards the flow-to-DRB mapping, and also the SDAP and PDCP configuration to the current gNB-CU-UP. The current gNB-CU-UP responds with the BEARER CONTEXT SETUP RESPONSE message (or new message) to the current gNB-CU-CP via E1 interface. The BEARER CONTEXT SETUP RESPONSE message (or new message) contains the UL TNL address information for F1-U, and DL TNL address information for NG-U, and also DL TNL address information for Xn-U. The current gNB-CU-CP sends the UE CONTEXT SETUP REQUEST (or new message) to the current gNB-DU via F1 interface. The UE CONTEXT SETUP REQUEST (or new message) may include SRB ID(s) and DRB ID(s) to be setup (i.e. list of bearers to be setup), and also the UL TNL address information for F1-U (i.e. F1-UL TEIDs). The UE CONTEXT SETUP REQUEST message (or new message) may include the Downlink Data Buffering Indication IE. Until the UE enters into RRC_CONNECTED, the Downlink Data Buffering Indication IE prevents the current gNB-DU from transmitting the buffered DL data towards the UE.

Step S1226: The current gNB-DU responds with the UE CONTEXT SETUP RESPONSE message (or new message) to the current gNB-CU-CP via F1 interface. The UE CONTEXT SETUP RESPONSE message (or new message) contains RLC/MAC/PHY configuration of SRB and DRBs provided by the gNB-DU (i.e. list of bearers admitted/rejected), and also DL TNL address information for F1-U (i.e. F1-DL TEIDs).

Step S1228: The current gNB-CU-CP sends the BEARER CONTEXT MODIFICATION REQUEST message (or new message) to the current gNB-CU-UP via E1 interface. The BEARER CONTEXT MODIFICATION REQUEST message (or new message) contains the DL TNL address information for F1-U (i.e. F1-DL TEIDs). The BEARER CON- TEXT MODIFICATION REQUEST message (or new message) may contain updated user plane keys (i.e. $K_{UPenc}$, $K_{UPint}$).

Step S1230: The current gNB-CU-UP responds with the BEARER CONTEXT MODIFICATION RESPONSE message (or new message) to the current gNB-CU-CP via E1 interface.

Step S1232 is omitted.

Step S1234: Upon receiving the BEARER CONTEXT MODIFICATION RESPONSE message (or new message) from the current gNB-CU-UP, the current gNB-CU-CP generates RRC Resume message (or new message) to notify the UE of transiting from RRC_INACTIVE to RRC_CONNECTED.

Step S1236: The current gNB-CU-CP sends the DOWNLINK RRC MESSAGE TRANSFER message (or new message) to the current gNB-DU via F1 interface. The DOWNLINK RRC MESSAGE TRANSFER message (or new message) includes SRB ID and the container which piggybacks the RRC Resume message. If the Data Forwarding Start Indication IE is included into the DOWNLINK RRC MESSAGE TRANSFER message (or new message), the current gNB-DU starts transmitting the buffered DL data to the UE as soon as the HARQ-ACK for the RRC Resume message piggybacked in Step S1236 is received by the current gNB-DU.

Alternatively, the current gNB-CU-CP may send the DATA FORWARDING START INDICATION message to the current gNB-DU via F1 interface to allow the current gNB-DU to transmit the buffered DL data to the UE.

Step S1238: The current gNB-DU forwards the RRC Resume message (or new message) to the UE over SRB1 indicated by the SRB ID.

Step S1240 is not modified.

Step S1242: The current gNB-CU-CP sends the DATA FORWARDING ADDRESS INDICATION message to the last serving gNB-CU-CP via Xn interface to inform the last serving gNB-CU-CP of successfully established PDU Session Resource contexts to which DL user data pending at the last serving gNB-CU-UP can be forwarded. Upon receiving the DATA FORWARDING ADDRESS INDICATION message, the last serving gNB-CU-CP sends the BEARER CONTEXT RELEASE COMMAND message to the last serving gNB-CU-UP via E1 interface in order to forward pending DL user data to the indicated TNL addresses. The BEARER CONTEXT RELEASE COMMAND message contains the DL TNL address information for Xn-U. The last serving gNB-CU-UP responds with the BEARER CONTEXT RELEASE COMPLETE message. The last serving gNB-CU-UP forwards pending DL user data to the current gNB-CU-UP. Since the current gNB-CU-UP is now aware of the F1-DL TEIDs for the PDU session(s), the current gNB-CU-UP initiates to forward the buffered DL data to the current gNB-DU. If the UE does not enter into RRC_CONNECTED yet, the current gNB-DU may buffer the DL data received from the current gNB-CU-UP. If the current gNB-DU is aware of the reception of the RRC Resume message in the UE, the current gNB-DU forwards the DL data to the UE.

Step S1244: Upon receiving the RRC Resume message (or new message) from the current gNB-DU in Step S1236, the UE sends the RRC Resume Complete message (or new message) to the current gNB-DU to confirm that the RRC connection was resumed successfully.

Step S1246: The current gNB-DU sends the UPLINK RRC MESSAGE TRANSFER message (or new message) to the current gNB-CU-CP via F1 interface. The UPLINK RRC MESSAGE TRANSFER message (or new message) includes the container which piggybacks the RRC Resume Complete message.

Step S1248: The current gNB-CU performs path switch procedure with the NGC. The current gNB-CU-CP triggers the release of the UE resources at the last serving gNB-CU-CP.

According to the embodiment 2-2 of the present invention described in FIGS. 12 and 13, according to the delivery of the RRC Resume message, the gNB-CU-CP can efficiently control whether the gNB-DU forwards the buffered DL data to the UE or not. Therefore, the UE's experience can be enhanced since the loss of DL data can be avoided and the unnecessary latency due to the data retransmission can be reduced. The buffered DL data may be more quickly transmitted to the UE than the embodiment 2-1 of the present invention, since the MAC layer receiving HARQ-ACK is located in the gNB-DU. However, the gNB-DU may be restricted by the buffer size.

The present invention described above may also be applied to CU-DU split in LTE case for resuming the UE context in the narrowband (NB) internet-of-things (IoT) UE and the lightly connected UE.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a central unit (CU) user plane (UP) of a gNB configured to operate in a wireless communication system, the method comprising:

receiving, from a user plane function (UPF) in a core network, downlink (DL) data to be transmitted to a user equipment (UE), wherein the UE is in a radio resource control (RRC) inactive state in which the gNB stores a context of the UE and a connection between the gNB and the core network is maintained;

transmitting, to a CU-control plane (CU-CP) of the gNB, a DL data notification message based on receiving the DL data;

receiving, from the CU-CP, information related to discarding of the DL data based on a radio access network (RAN) paging failure for the UE in the RRC inactive state; and based on the information, discarding the DL data and keeping the context of the UE stored in the gNB, wherein the CU-CP is a logical node constituting the gNB that hosts a radio resource control (RRC) protocol and a packet data convergence protocol (PDCP)-C protocol, and wherein the CU-UP is a logical node constituting the gNB that hosts a PDCP-U protocol.

2. The method of claim 1, wherein the connection between the gNB and the core network includes an NG-C connection between the CU-CP and an access and mobility management function (AMF) in the core network and an NG-U connection between the CU-UP and the UPF in the core network.

3. The method of claim 1, wherein the connection between the gNB and the core network is maintained after receiving the information.

4. The method of claim 1, wherein the information is received via a bearer context modification request message.

5. A gNB in a wireless communication system, the gNB comprises,
   a central unit (CU)-control plane (CU-CP); and
   a CU-user plane (CU-UP), wherein the CU-UP is configured to perform operations comprising:
   receiving, from a user plane function (UPF) in a core network, downlink (DL) data to be transmitted to a user equipment (UE), wherein the UE is in a radio resource control (RRC) inactive state in which the gNB stores a context of the UE and a connection between the gNB and the core network is maintained;
   transmitting, to the CU-CP, a DL data notification message based on receiving the DL data;
   receiving, from the CU-CP, information related to discarding of the DL data based on a radio access network (RAN) paging failure for the UE in the RRC inactive state; and
   based on the information, discarding the DL data and keeping the context of the UE stored in the gNB,
   wherein the CU-CP is a logical node constituting the gNB that hosts a radio resource control (RRC) protocol and a packet data convergence protocol (PDCP)-C protocol, and
   wherein the CU-UP is a logical node constituting the gNB that hosts a PDCP-U protocol.

6. The gNB of claim 5, wherein the connection between the gNB and the core network includes an NG-C connection between the CU-CP and an access and mobility management function (AMF) in the core network and an NG-U connection between the CU-UP and the UPF in the core network.

7. The gNB of claim 5, wherein the connection between the gNB and the core network is maintained after receiving the information.

8. The gNB of claim 5, wherein the information is received via a bearer context modification request message.

* * * * *